US012762451B2

(12) United States Patent
Wang et al.

(10) Patent No.: US 12,762,451 B2
(45) Date of Patent: Oct. 13, 2026

(54) METHODS, ARCHITECTURES, APPARATUSES AND SYSTEMS FOR ENABLING JOINT QUANTUM MEASUREMENT AND MEMORY AS A SERVICE

(71) Applicant: InterDigital Patent Holdings, Inc., Wilmington, DE (US)

(72) Inventors: Chonggang Wang, Princeton, NJ (US); Shamim Rahman, Cote St. Luc (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 503 days.

(21) Appl. No.: 18/290,133

(22) PCT Filed: May 10, 2022

(86) PCT No.: PCT/US2022/028461
§ 371 (c)(1),
(2) Date: Nov. 9, 2023

(87) PCT Pub. No.: WO2022/240801
PCT Pub. Date: Nov. 17, 2022

(65) Prior Publication Data

US 2024/0378476 A1 Nov. 14, 2024

Related U.S. Application Data

(60) Provisional application No. 63/186,363, filed on May 10, 2021.

(51) Int. Cl.
*G06N 10/40* (2022.01)
*G06N 10/20* (2022.01)

(52) U.S. Cl.
CPC ............ *G06N 10/40* (2022.01); *G06N 10/20* (2022.01)

(58) Field of Classification Search
CPC ...................................................... G06N 10/40
See application file for complete search history.

(56) References Cited

U.S. PATENT DOCUMENTS

2020/0153619 A1* 5/2020 Ribordy ................ H04L 9/0852
2021/0119788 A1* 4/2021 Wang .................. H04B 10/272
(Continued)

FOREIGN PATENT DOCUMENTS

WO WO 2021016095 A1 1/2021

OTHER PUBLICATIONS

NPL Banchi Long quantum channels for high quality entanglement transfer 2011.*
(Continued)

*Primary Examiner* — Paul M Knight
(74) *Attorney, Agent, or Firm* — Mark D. Pratt

(57) ABSTRACT

Procedures, methods, architectures, apparatuses, systems, devices, and computer program products of quantum measurement implemented by a device, the device configured to communicate with a client and with one or more servers, wherein the one or more servers comprise one or more quantum measurement physical equipment, the method comprising: receiving qubits from the client via a first quantum channel between the device and the client; performing a first qubit operation on the qubits to obtain transformed qubits; sending a first portion of the transformed qubits to the first server via a second quantum channel between the device and the first server; receiving, from the first server, information associated with first quantum measurement results of the first portion of the transformed qubits.

20 Claims, 30 Drawing Sheets

(56) References Cited

U.S. PATENT DOCUMENTS

| | | | | |
|---|---|---|---|---|
| 2021/0176055 A1* | 6/2021 | Rahman | ................ | H04L 9/0855 |
| 2022/0092460 A1* | 3/2022 | Piveteau | ................ | G06N 10/70 |
| 2022/0269976 A1* | 8/2022 | Wang | ..................... | G06N 10/80 |
| 2023/0058053 A1* | 2/2023 | Hunt | ..................... | H04L 9/3247 |

OTHER PUBLICATIONS

NPL Bartlett A distributed simulation framework for quantum networks 2018.*
NPL Caleffi Quantum Switch for the Quantum Internet 2020.*
NPL Childs Circuit Transformations for Quantum Architectures 2019.*
NPL Dahlberg A Link Layer Protocol for Quantum Networks 2019.*
NPL Duplinskiy Quantum Secured Data Transmission 2018.*
NPL Huo Deterministic quantum teleportation through fiber channels 2018.*
NPL Jones Tuning Q channels to maximize polarization entanglement for telecom photon pairs 2018.*
NPL Karimipour Quasi inversion of qubit channels 2020.*
NPL Kozlowski Designing a Quantum Network Protocol 2020.*
NPL Li Randomness determines practical security of BB84 2015.*
NPL Maguire How to build a teleportation machine 2012.*
NPL Pirandola End to end capacities of a Q communication network 2019.*
NPL Sazim Retrieving and routing quantum information 2015.*
NPL Silva Interference in a Quantum Channel 2012.*
NPL Van Meter Designing Quantum Repeater Networks 2013.*
NPL Wang Quantum Enabled 6G 2022 Inventor Pub.*
NPL Wehner Quantum internet A vision for the road ahead 2018.*
NPL Wright Benchmarking an 11 qubit quantum computer 2019.*
Hsu, Jeremy, "Photonic Quantum Computer Displays "Supremacy" Over Supercomputers", IEEE Spectrum for the Technology Insider, Dec. 9, 2020, 3 pages.
Awschalom et al., "Development of Quantum Interconnects (QuICs) for Next-Generation Information Technologies", APS Advancing Physics, PRX Quantum, Physical Review Journal, vol. 2, Issue No. 1, Feb. 2021, 5 pages.
Dahlberg et al., "A Link Layer Protocol for Quantum Networks", Cornell University Library, Quantum Physics, arXiv:1903.09778, Mar. 23, 2019, 56 pages.
"The D-Wave 2000Q™ Quantum Computer Technology Overview", D-Wave Systems Inc., The Quantum Computing Company, Oct. 2020, 12 pages.
Ma et al., "One-Hour Coherent Optical Storage in an Atomic Frequency Comb Memory", Nature Communications, vol. 12, Article No. 2381, Apr. 22, 2021, 6 pages.
Bennett et al., "Quantum Cryptography: Public Key Distribution and Coin Tossing", International Conference on Computers, Systems & Signal Processing, Bangalore, India, Dec. 10, 1984, 6 pages.
Saad et al., "A Vision of 6G Wireless Systems: Applications, Trends, Technologies, and Open Research Problems", Institute of Electrical and Electronics Engineers (IEEE), IEEE Network, vol. 34, Issue No. 3, May/Jun. 2020, 9 pages.
"3rd Generation Partnership Project; Technical Specification Group Services and System Aspects; System architecture for the 5G System (5GS); Stage 2 (Release 16)", 3GPP TS 23.501 V16.5.1, Aug. 2020, 440 pages.
Karinou et al., "Toward the Integration of CV Quantum Key Distribution in Deployed Optical Networks", Institute of Electrical and Electronics Engineers (IEEE), IEEE Photonics Technology Letters, vol. 30, Issue No. 7, Apr. 1, 2018, 4 pages.
"Quantum Computing, Progress and Prospects", The National Academies of Sciences Engineering Medicine, Consensus Studies Report, 2018, 206 pages.
"O-RAN Architecture Description", O-RAN Alliance, O-RAN.WG1.0-RAN-Architecture-Description-v02.00, Jul. 2020, 28 pages.
Bronn et al., "Fast, High-Fidelity Readout of Multiple Qubits", Journal of Physics, Conference Series 834, 12th International Workshop on Low Temperature Electronics, Sep. 18, 2016, Tempe, Arizona, USA, 11 pages.
Choi et al., "First Photonic Quantum Computer on the Cloud", IEEE Spectrum for the Technology Insider, Sep. 9, 2020, 3 pages.
Nachman et al., "Unfolding Quantum Computer Readout Noise", NPJ Quantum Information, vol. 6, Article No. 84, Sep. 25, 2020, 7 pages.
Satoh et al., "Attacking the Quantum Internet", Cornell University Library, Quantum Physics, arVix:2005:04617v1, May 10, 2020, 14 pages.

* cited by examiner

METHODS, ARCHITECTURES, APPARATUSES AND SYSTEMS FOR ENABLING JOINT QUANTUM MEASUREMENT AND MEMORY AS A SERVICE

CROSS-REFERENCE TO RELATED APPLICATIONS

This application is a U.S. National Stage Application under 35 U.S.C. § 371 of International Patent Application No. PCT/US2022/028461, filed May 10, 2022, which claims the benefit of U.S. Provisional Patent Application No. 63/186,363 filed May 10, 2021, which is incorporated herein by reference.

BACKGROUND

The present disclosure is generally directed to the fields of communications, software and encoding, including, for example, to methods, architectures, apparatuses, systems directed to quantum communications and computing, for example to methods, apparatus and systems using quantum communications and computing to perform quantum key distribution (QKD) and other quantum applications.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGs.) and the detailed description are not to be considered limiting, and other equally effective examples are possible and likely. Furthermore, like reference numerals ("ref.") in the FIGs. indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
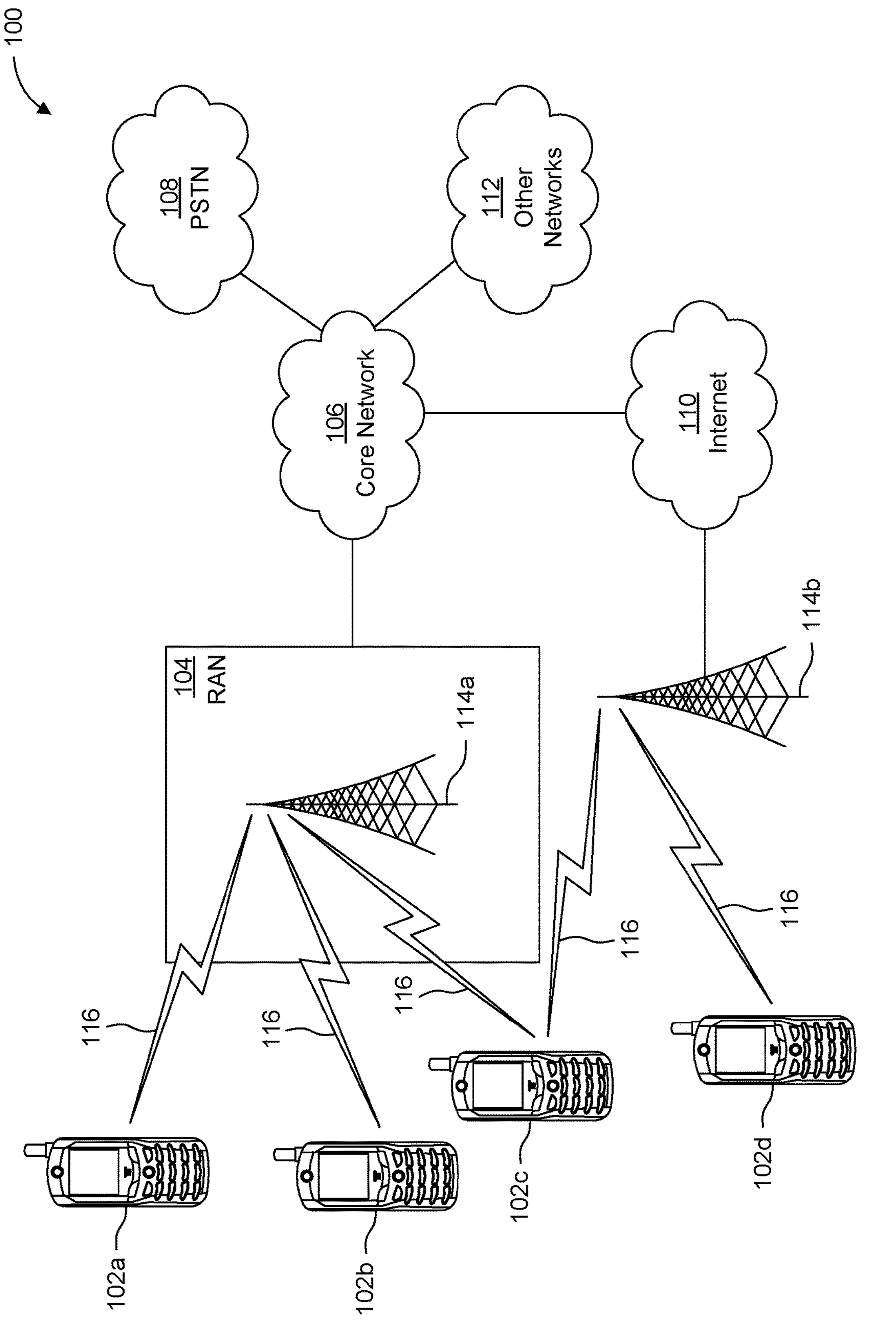
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104/113, a core CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d*, e.g., to facilitate access to one or more communication networks, such as the CN 106/115, the Internet 110, and/or the networks 112. By way of example, the base stations 114*a*, 114*b* may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in an embodiment, the base station 114*a* may include three transceivers, i.e., one for each sector of the cell. In an embodiment, the base station 114*a* may employ multiple-input multiple output (MIMO) technology and may utilize multiple transceivers for each or any sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In an embodiment, the base station 114*a* and the WTRUs 102*a*, 102*b*, 102*c* may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95

(IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
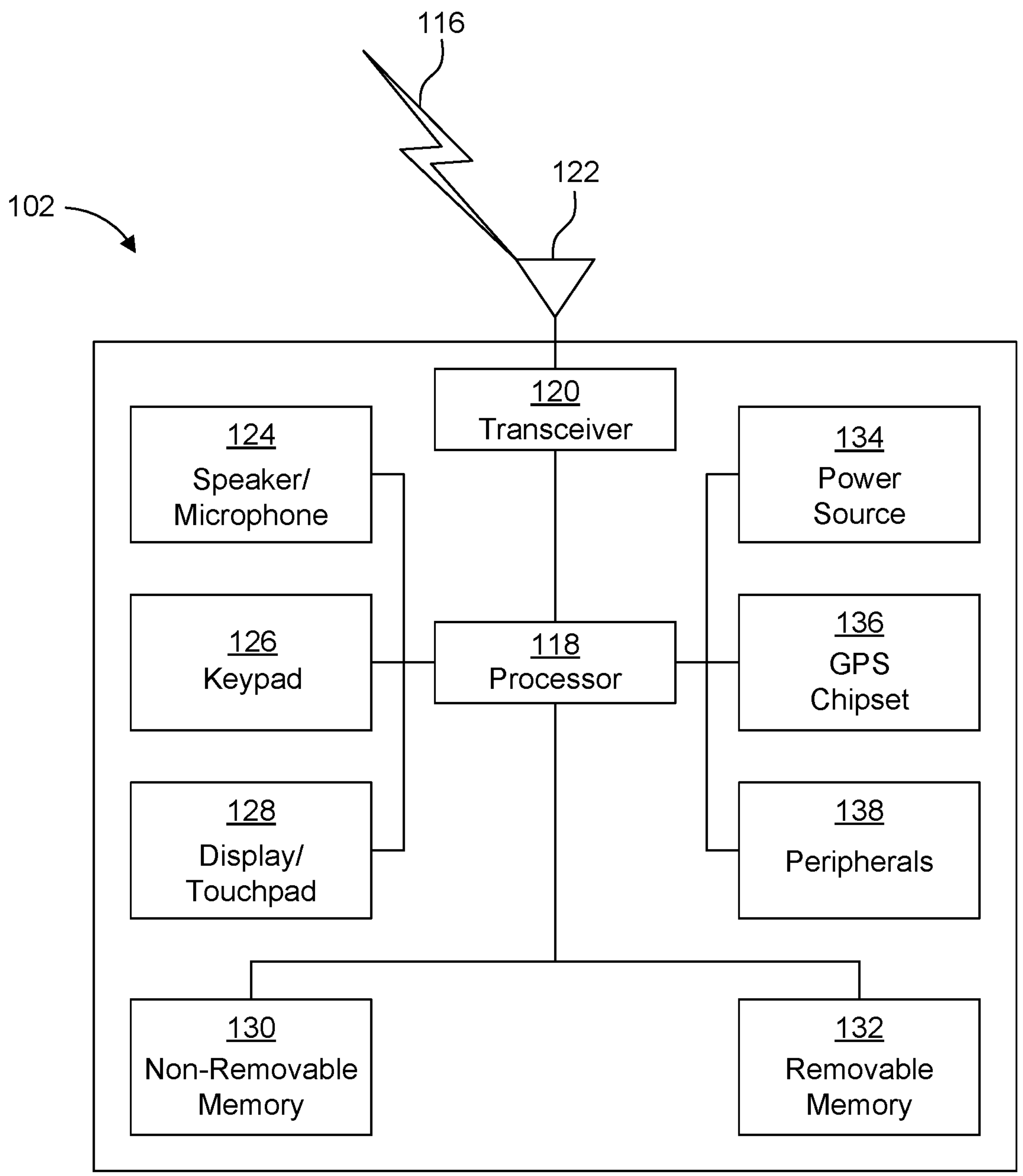
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
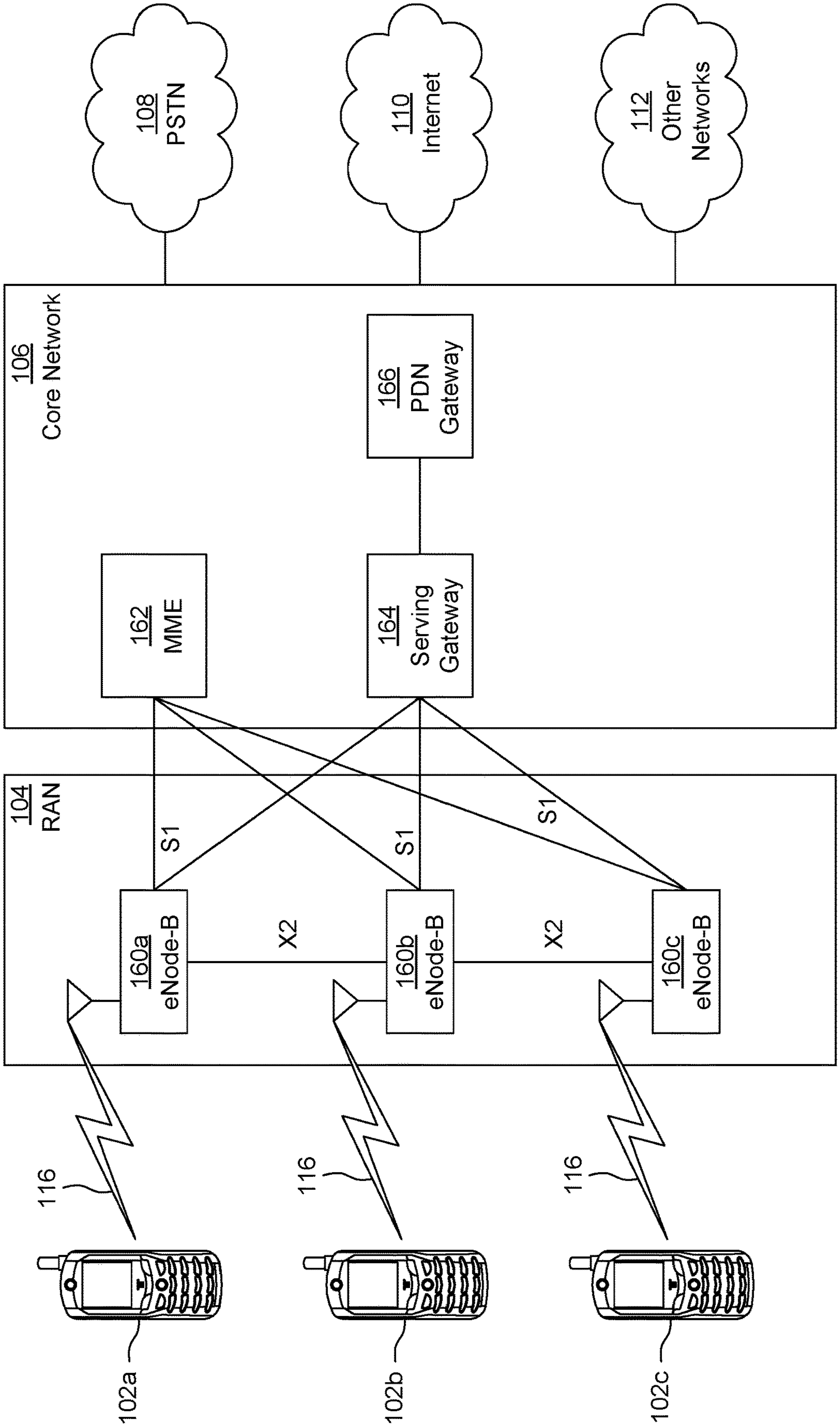
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160*a*, 160*b*, and 160*c* in the RAN 104 via an SI interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode-Bs 160*a*, 160*b*, 160*c* in the RAN 104 via the SI interface. The SGW 164 may generally route and forward user data packets to/from the WTRUs 102*a*, 102*b*, 102*c*. The SGW 164 may perform other functions, such as anchoring user planes during inter-eNode-B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an “ad-hoc” mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHZ, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
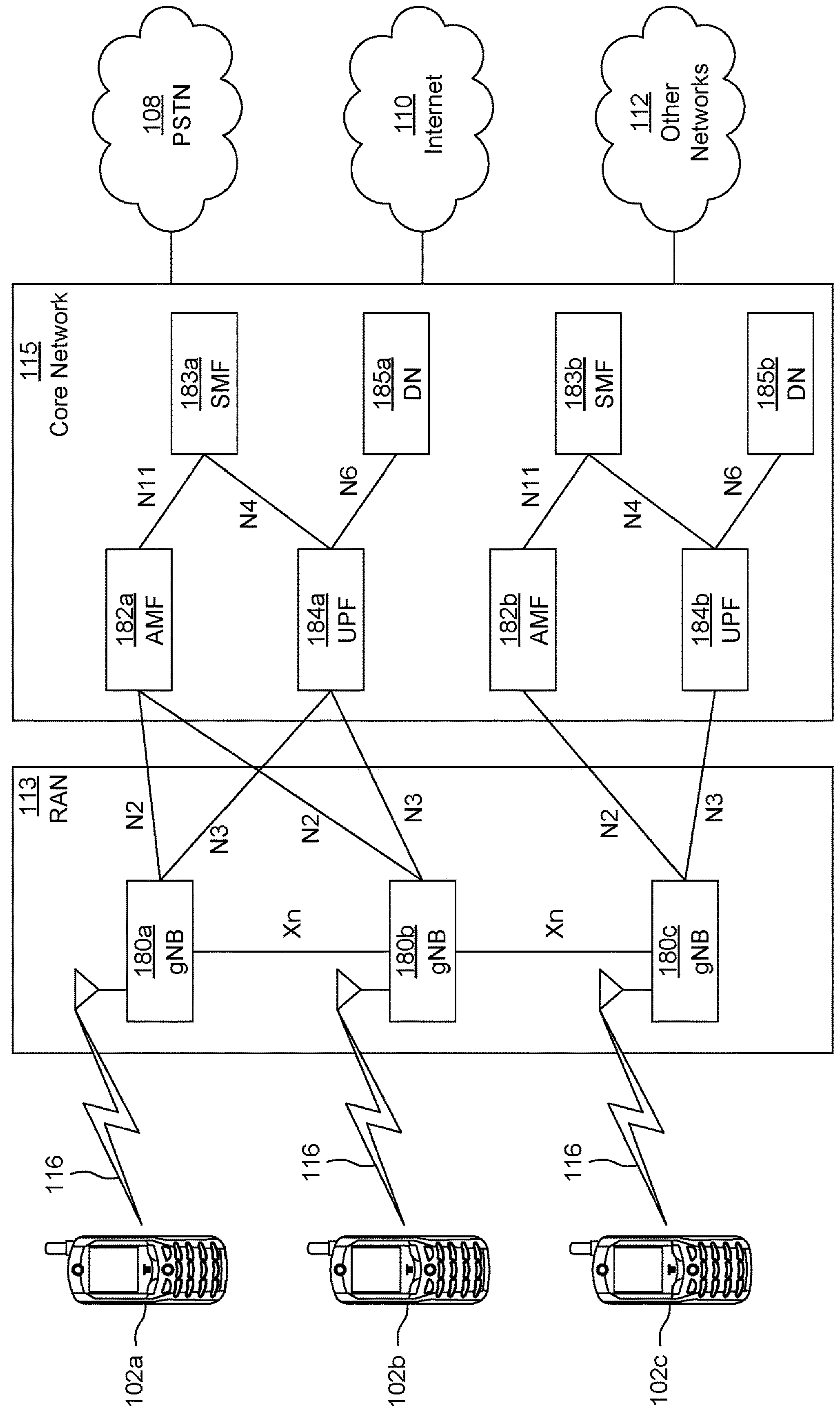
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In an embodiment, the gNBs 180*a*, 180*b*, 180*c* may implement MIMO technology. For example, gNBs 180*a*, 180*b* may utilize beamforming to transmit signals to and/or receive signals from the WTRUs 102*a*, 102*b*, 102*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., including a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184*a*, 184*b*, routing of control plane information towards access and mobility management functions (AMFs) 182*a*, 182*b*, and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one session management function (SMF) 183*a*, 183*b*, and at least one Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of NAS signaling, mobility management, and the like. Network slicing may be used by the AMF 182*a*, 182*b*, e.g., to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, e.g., to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In an embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to any of: WTRUs 102*a-d*, base stations 114*a-b*, eNode-Bs 160*a-c*, MME 162, SGW 164, PGW 166, gNBs 180*a-c*, AMFs 182*a-b*, UPFs 184*a-b*, SMFs 183*a-b*, DNs 185*a-b*, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

INTRODUCTION

5G System Architecture 5G system as shown in FIG. 1D may provide a service-based architecture (SBA). Especially, 5G core network may be service-centric and may comprise a variety of network functions. Each network function may provide services to other network functions and may also access services provided by other network function. In other words, each network function may be both a service provider and a service consumer. All network functions may interact with each other through service-based interfaces. Service-based interfaces may be as a simple as a request/response model and/or a subscription/notification model. Most network functions may be designed for control plane functionalities and (e.g., only) a few network functions (e.g., user plane function). With such service-centric 5G core network, the latency of inter-network-function communications may be (e.g., greatly) reduced; the scalability may be also improved. In addition, it may also become easier to introduce new network functions to the system. The 5G RAN may support the radio infrastructure used to communicate with the UE over the air interface. The RAN may also support the configuration known as O-RAN which may allow a flexible mixing and/or matching of nodes from different suppliers.

Figure 2:
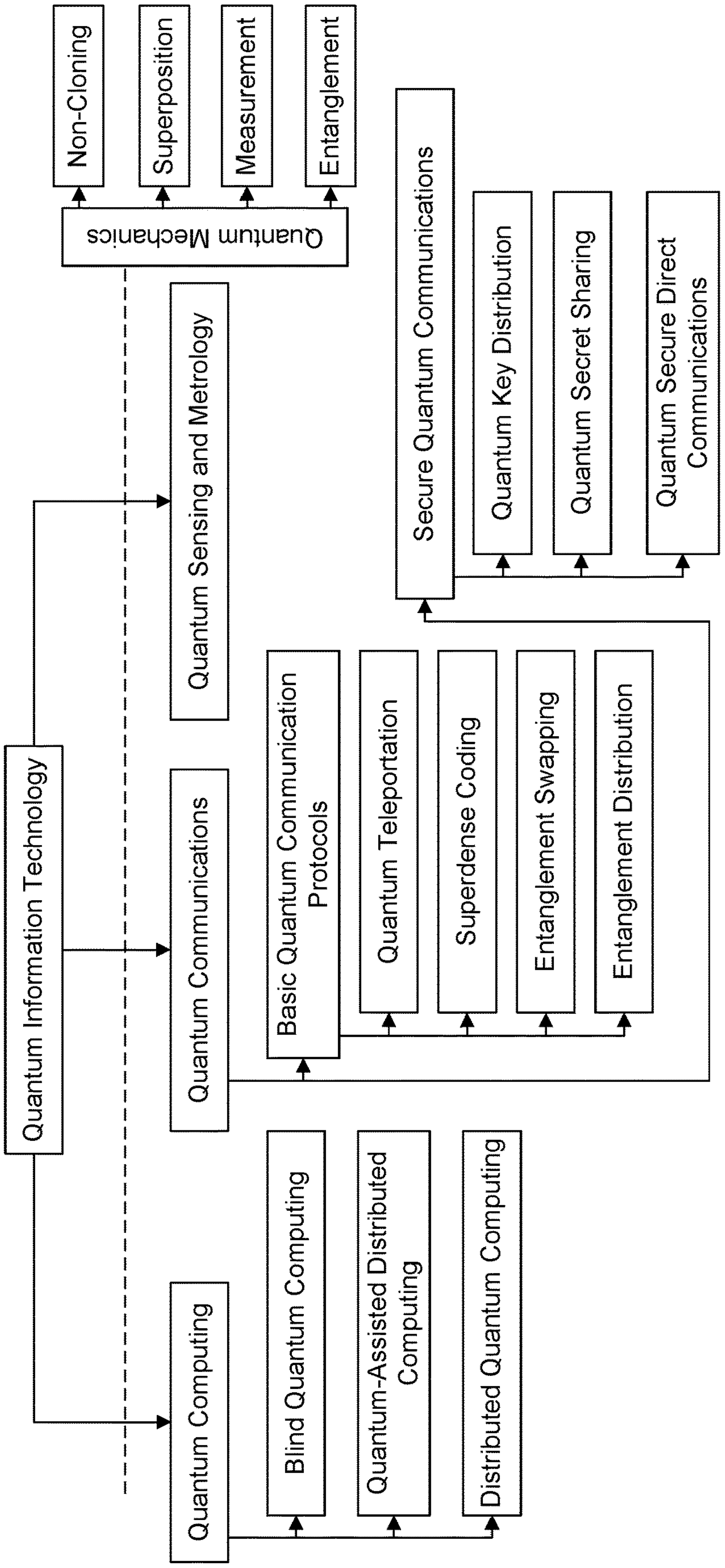
FIG. 2 illustrates an example of Quantum Information Technology.

As illustrated in FIG. 2, Quantum Information Technology (QIT) may generally include four main areas: quantum mechanics, quantum communications, quantum computing, and quantum sensing and metrology. Quantum mechanics may provide theoretical foundations and building blocks for quantum communications, quantum computing, and/or quantum sensing and metrology. For example, entanglement may be leveraged for not only quantum communications, but also quantum computing and/or quantum sensing. In addition, quantum communications and quantum computing may leverage each other and may be integrated together to revolutionize classical internet toward future quantum internet. For instance, quantum teleportation as one of basic quantum communications protocols may be used to facilitate teleportation of quantum states between quantum computers. To leverage quantum information technology, the last step may be often to store and/or measure quantum states or physical qubits (e.g., photons, ions) in the target quantum system and to generate measurement results in classic bits for future use. This process may be referred to as quantum measurement or readout. Quantum measurement may be used (e.g., required) for quantum communications, quantum computing and quantum sensing.

Quantum Information Technology

Figure 3:
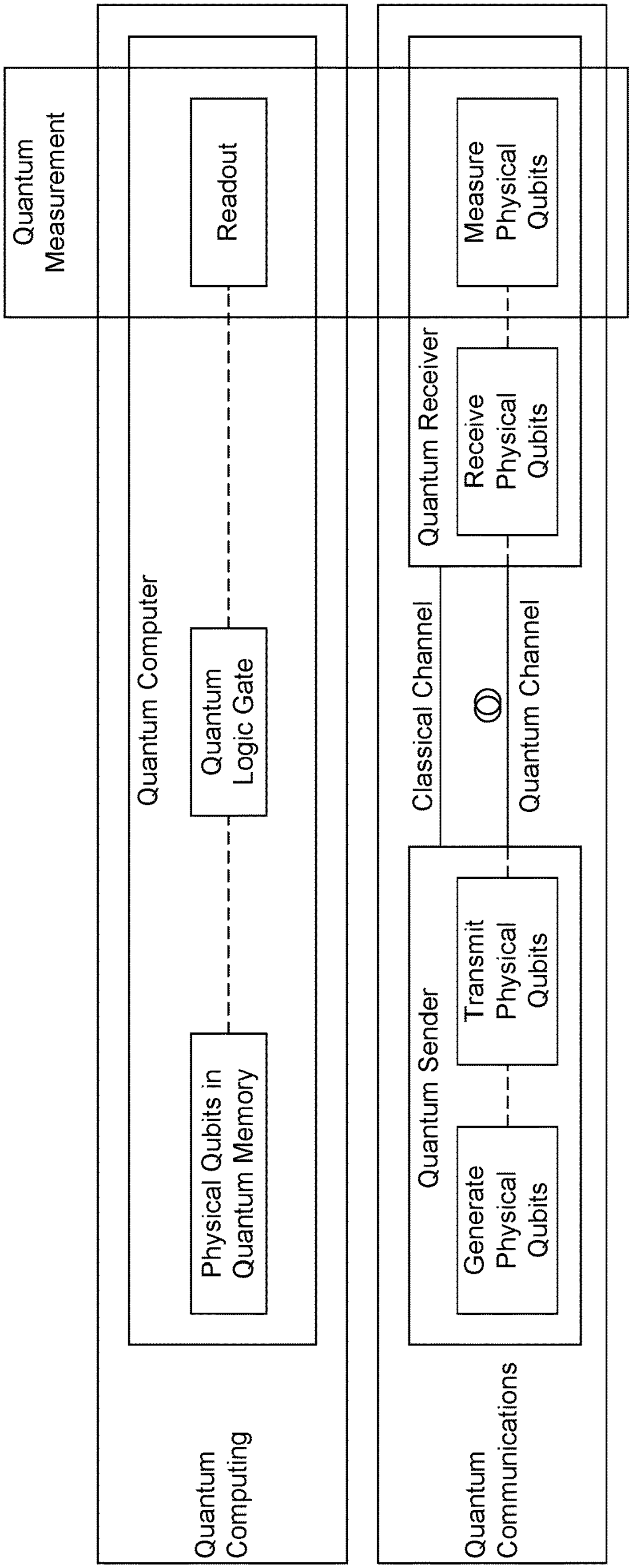
FIG. 3 depicts an example of Quantum Memory and Measurement in Quantum Communications and Quantum Computing.

FIG. 3 illustrates a general schematic for both quantum computing and quantum communications, where the right-most part of the figure illustrates quantum measurement (e.g., readout in quantum computing, measure physical qubits in quantum communications). For example, in QKD protocols like BB84, the quantum receiver may receive physical qubits (e.g., polarized photons) from quantum sender and may measure them to generate classical bits, which may be fed back to the quantum sender via classical channel as a part of QKD protocols. In quantum computing systems, for example, based on trapped ions, ions as physical qubits may pass through quantum logic gates and in such a case may be readout to generate classical bits as the solution to a computation problem.

Quantum measurement may be usually done by a quantum measurement equipment, which may (e.g., unavoidably) introduce noise or errors. In fact, quantum measurement errors may be a (e.g., major) error source to the whole quantum system, regardless of whether it may be quantum communications system, quantum computing system and/or quantum sensing system. One of the reasons may be that quantum measurement may take a long time to reach a stable probability distribution of measured quantum states (e.g., $|1\rangle$ or $|0\rangle$); when the measurement time may exceed physical qubit decoherence time, a qubit in $|0\rangle$ state could be measured in $|1\rangle$ state or vice versa. Methods for achieving fast and high-fidelity (e.g., low measurement error rate) quantum measurement may not be available or feasible to be deployed in large-scale and anywhere in the system due to hardware and environment constraints. A quantum computer may have a control and measurement plane, which may include a very precise laser (or microwave) source that can be directed at a specific ion to affect its quantum state, another laser to ‘cool’ and enable measurement of the ions, and a set of photon detectors to ‘measure’ the state of the ions by detecting the photons that they scatter. On the other hand, quantum measurement technology may be still evolving, and different types of quantum measurement methods and equipment may be proposed and deployed for different application scenarios. In addition, quantum measurement may have potential attacks and security threats. Giving these considerations, it may be beneficial (e.g., higher utilization, higher measurement performance, better flexibility, better security) to provide quantum measurement as a service, which can be easily and securely managed (e.g., scale up, sale down) to cater for different needs.

Quantum Information Technology for 6G Systems

QIT has been visioned as one of critical enabling technologies for future 6G wireless systems. 6G wireless systems in the sense of THz frequency may support (300 GHz to 1 THz range). For example, quantum communications like QKD can make 6G systems secure against post-quantum cryptography attacks. Quantum computing also can be leveraged to solve challenging wireless resource optimization problems in 6G systems and in turn make it possible to find, for example, the optimal wireless resource allocation solution. In the meantime, as has been witnessed in present and previous 5G, 4G and 3G system, the deployment of a new technology may evolve in various phases. QIT may be used in future 6G systems according to multiple stages (e.g., near-term, middle-term, long-term). Such QIT-enabled 6G evolution may have three perspectives:

Each evolution stage may gradually introduce one or multiple specific new quantum technologies, for example, based on technology and commercialization maturity. For example, QKD may be a good choice for near-term 6G (or the enhancement of 5G) since commercial QKD products may be available. In contrast, quantum computing may be available for long-term 6G systems.

For a specific quantum technology, it may provide different features/versions to be deployed gradually in various stages. For example, BB84 as the classical QKD may be deployed immediately (e.g., to enhance 5G), while entanglement-based QKD protocols may become available for mid-term and/or long-term 6G systems.

In each evolution stage, one or multiple quantum technologies may gradually be deployed from a small scale/scope to a large scale/scope. For example, quantum computing may be first deployed in 6G core networks and gradually extend to other places like edge networks and even end devices after a long-term evolution. In general, quantum hardware (e.g., quantum measurement devices) may first become available in core network and potentially shared by other network entities. When quantum hardware may grow more mature (e.g., reduced deployment constraints, miniaturized hardware that can operate at room temperature), it may be deployed toward the edge of 6G systems.

Quantum Hardware

With ever-increasing progress in quantum hardware and numerous successes in practical quantum experiments, some QIT applications such as QKD may be increasingly commercially viable.

As for commercial quantum computers, quantum computers may achieve 2000 qubits and may have software architecture to support multiple industries (e.g., financial modelling, materials simulation, medical chemistry simulation, industrial optimization, etc.)

Quantum computer may achieve quantum advantage over classical computers in 200 seconds calculation, compared to 2 days if using classical supercomputers.

One of big challenges for commercial quantum computers is their stringent requirement on ultra-low temperature. Now, photonic quantum computer with multiple qubits (currently 8 and 12 qubit computers and targeting 24 qubit support in near future) may work in room temperature (e.g., non-cryogenic).

Another big challenge for both quantum computing and quantum communication may be quantum memory, especially how long qubits can be reliably stored in quantum memory without the loss of expected fidelity. The long-lived quantum solid state optical memory over one hour may be possible.

As a QIT application, QKD has been deployed in telecom networks. QKD may even be (e.g., simply) deployed over existing telecommunications fiber optical networks without installing dedicated optical fibers as quantum channels.

Quantum-Enabled Open Radio Access Network (O-RAN)

Figure 4:
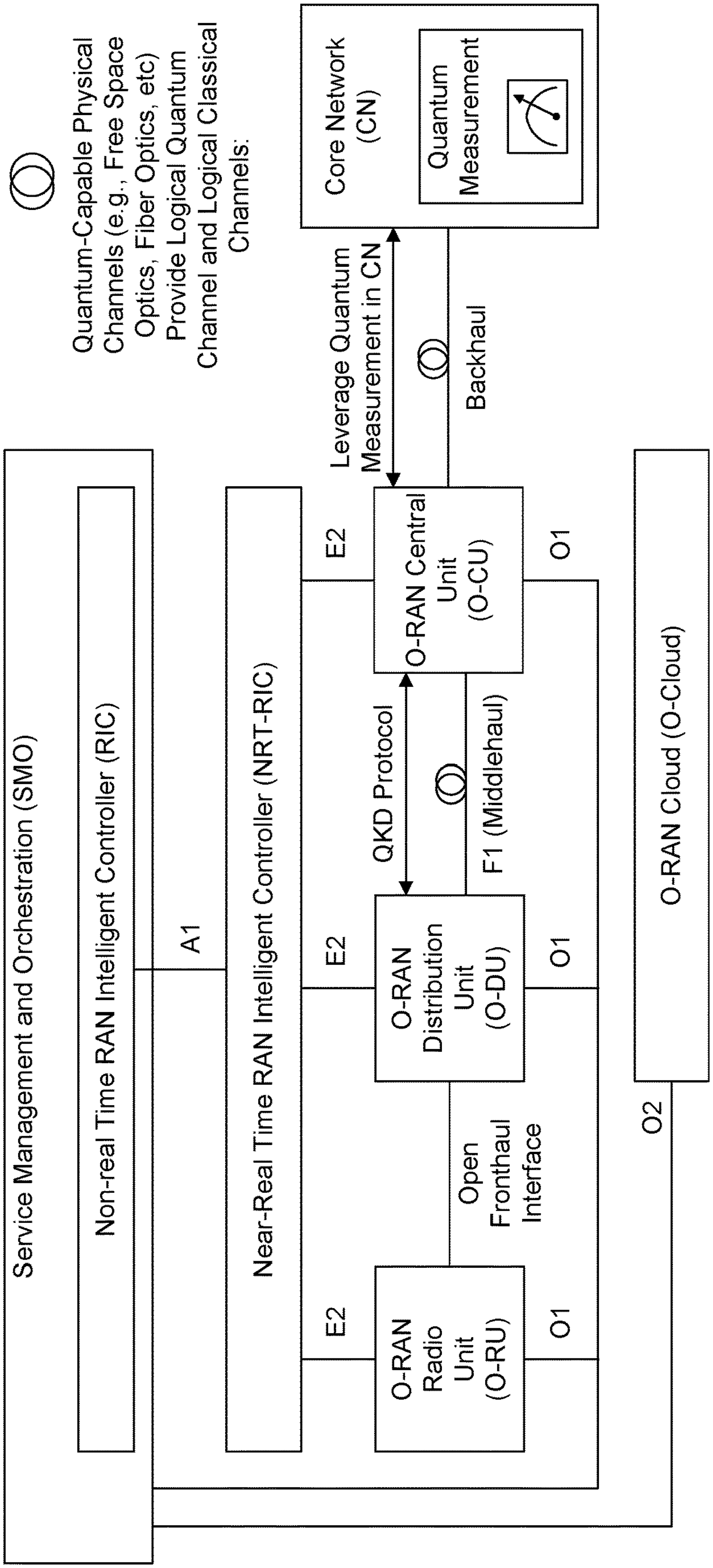
FIG. 4 illustrates an example of a Quantum-Enabled Open Radio Access Network (O-RAN)

QIT can be leveraged to enable a more secure and deployable infrastructure for O-RAN. FIG. 4 illustrates an example setting for secure communications between a O-RAN Distribution Unit (O-DU) and a O-RAN Central Unit (O-CU), with the following configurations.

There may be at least a quantum channel and a classical channel between the O-DU and the O-CU, which could be provided by one or multiple quantum-capable physical channel such as fiber optics.

There may be at least a quantum channel and a classical channel between the O-CU and the CN, which could be provided by one or multiple quantum-capable physical channel such as fiber optics.

The O-DU and the O-CU may leverage a QKD protocol to securely exchange a secure key, which in turn may be used to encrypt communication packets over F1 interface between the O-DU and the O-CU.

For leveraging the QKD protocol, the O-DU may be responsible for sending a set of qubits (e.g., photons) sequentially to the O-CU.

The O-CU may receive these qubits from the O-DU over the quantum channel. According to the QKD protocol, the O-CU may be supposed to measure the received qubits and generate classical bits as the measurement result, which the O-CU may send back to the O-DU via the classical channel.

However, the O-CU may not have good quantum measurement capability (e.g., quantum measurement hardware such as fast and high-fidelity readout), which the CN may provide. In such a case, the O-CU may leverage the quantum measurement capability provided by the CN.

In order to exploit the quantum measurement capability in the CN, the O-CU may transmit all received qubits to CN via the quantum channel between the O-CU and the CN. The CN may receive the qubits from the O-CU; the CN may measure the qubits using random measurement basis according to the QKD protocol and generate measurement results in classical bits. In such a case, the CN may send the used measurement basis and the generated measurement results to the O-CU via the classical channel, assuming that secure communications between the CN and the O-CU may have been established.

After receiving the measurement basis and the measurement results from the CN, the O-CU may follow the QKD protocol and may send designated feedback (e.g., measurement basis) to the O-DU. The O-DU may receive the feedback from the O-CU; both of them may follow other steps as specified by the QKD protocol. Finally, the O-CU and the O-DU may be able to exchange and establish a shared security key between them.

The motivation behind the use case shown in FIG. 4 includes the following:

O-RAN components (e.g., O-DU, O-CU) may, by definition, be obtained from different equipment suppliers. Thus, (e.g., it may be very important that) they may be dynamically deployable and securely connected to each other in a simple manner. Otherwise, all subsequent user traffic flowing through the O-RAN nodes may be subject to security attacks such as eavesdropping, man-in-the-middle attacks, etc. QIT techniques like QKD can be used to alleviate this problem in an extremely effective manner. However, having full qubit storage and measurement ability in each O-RAN node can be complex and expensive from a hardware point of view. Thus, having a QMaaS may help ease of deployment of QIT in O-RAN deployments.

Various quantum measurement implementations usually lead to different measurement performance such as measurement speed, measurement fidelity, security, etc. In addition, various quantum measurement implementations may use (e.g., require) different environment conditions (e.g., temperature) and cause different implementation costs.

Network nodes or devices towards network edge such as O-CU may not have the luxury to have high-performance quantum measurement implementations due to factors such as environment constraints and/or cost consideration. In the meantime, these edge devices may benefit from quantum-enabled secure communications, which may demand quantum measurement. As a result, these edge devices may leverage quantum measurement capabilities and implementations deployed in the CN or in the cloud.

High-performance quantum measurement hosted in the CN may be protected with better security than the quantum measurement embedded in edge devices.

High-performance quantum measurement hosted in the CN may be shared by and provided to edge devices as a service to benefit both quantum measurement providers and edge devices as users, in terms of quantum measurement utilization gained by quantum measurement providers and reduced measurement expenses from edge devices.

It may be beneficial to provide joint QMaaS, so that QMaaS may be leveraged and shared by network nodes (or devices such as edge devices) that do not have quantum measurement capability. The overall issue is how to efficiently provide QMaaS. Specifically, the following problems may be solved in the following embodiments.

It may be difficult to store and precisely measure qubits due to hardware and system complexity. Therefore, providing a service to store and/or measure qubits may be very useful. The Qubits to be stored and/or measured may be co-located with QMaaS or may be from remote nodes; also, various nodes may trigger QMaaS. There are many different scenarios for leveraging QMaaS. The issue may be to design a secure, scalable, and efficient QMaaS functional architecture.

A QMaaS Client (QMC) may trigger QMaaS with dynamically changing storage and measurement instructions (e.g., storage time, measurement basis). The QMC may trigger QMaaS to store and measure existing qubits with QMaaS on a quantum node such as a quantum computer. Also, one QMaaS may not meet the requirement of the QMC. The issue may be to design a flexible client-Triggered QMaaS.

When a Quantum Source Node (QSN) may leverage QMaaS, it may (e.g., need to) send its to-be-stored-and-measured qubits to a QMaaS Server (QMS) that hosts QMaaS. Later, the QMS may (e.g., need to) send measurement results back to QSN. Although the QMS may be a trusted node, it still may potentially be attacked. The issue may be to guarantee the privacy and security of the measurement results; in other words, it may be (e.g., critical) useful to prevent QMS from deducing the real information being carried by the measured qubits, from the measurement results.

Overview

QMaaS Functional Architecture

Figure 5:
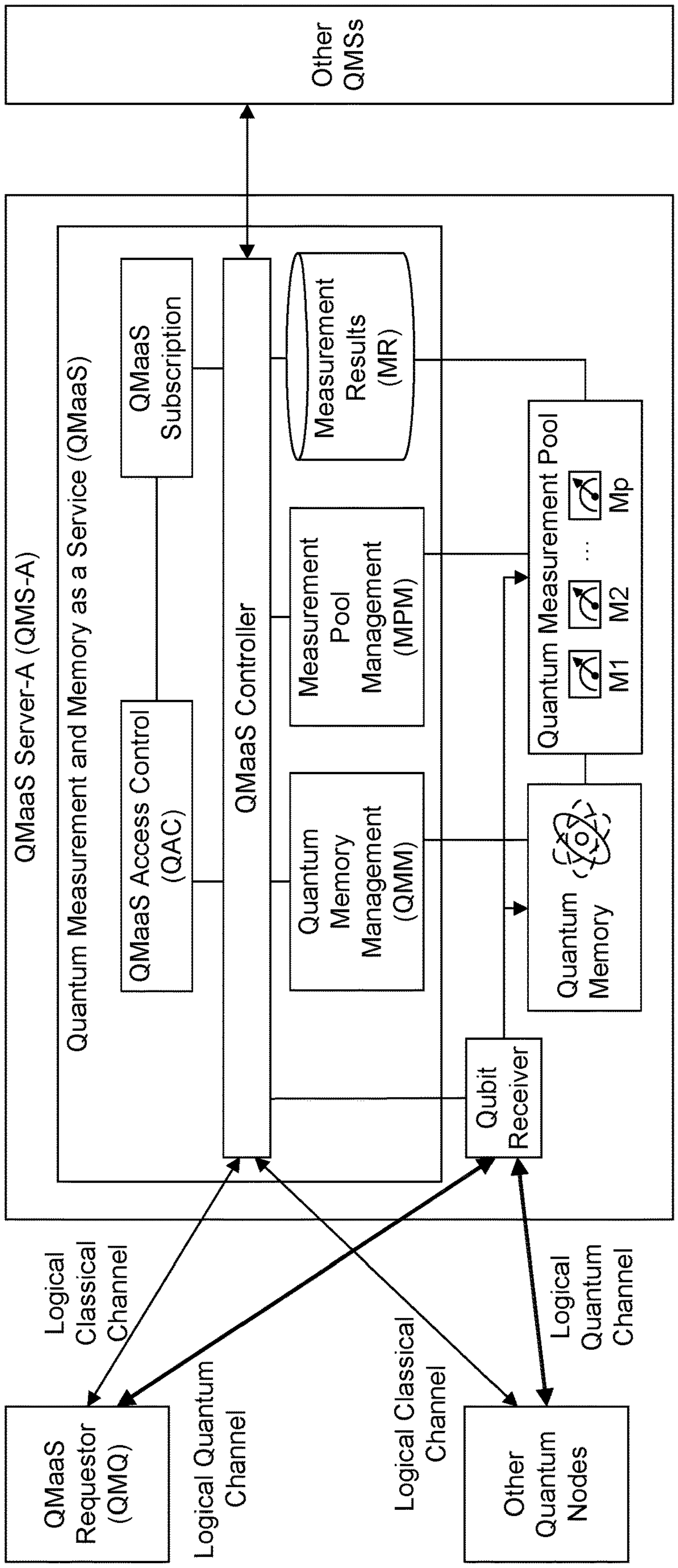
FIGS. 5 to 10 illustrate examples of a Quantum Measurement and Memory as a Service (QMaaS) Functional Architecture according to embodiments.

FIG. 5 illustrates a QMaaS Functional Architecture with the following entities/nodes and functionalities.

A QMaaS Server-A (QMS-A) may be a physical node, which may consist of three components: QMaaS, quantum measurement pool, and quantum memory. Quantum memory may be optional, while QMaaS and quantum measurement pool may be (e.g., needed) used. A QMS-A without quantum memory may receive physical qubits from QMaaS Requestors (QMQs) or other quantum nodes, (e.g., immediately) measures them, and finally may generate measurement results in classical bits.

As an example, the QMS-A may be deployed in the core network of future wireless systems such as 6G. In another example, the QMS-A may be deployed as a part of O-RAN systems such as being co-located with an O-CU. The QMS-A may also be co-located with a satellite a space information network or an unmanned aerial vehicle as a part of connected vehicle networks.

A QMS-A with quantum memory may store some physical qubits, which may be measured in the way as (e.g., required) needed by a QMQ at any time and, for example, based on the service agreement between the QMQs and the QMS-A.

The QMS-A may also optionally have quantum logic gate; as a result, the QMS-A may be essentially a quantum computer and physical qubits may be passed through quantum logic gate before being measured. In addition, quantum logic gate may be leveraged by quantum measurement for reducing and/or correcting measurement errors.

Quantum measurement pool may (e.g., consist of) comprise multiple quantum measurement physical settings (e.g., M1, M2, . . . , Mp). A quantum measurement physical setting may essentially be a quantum measurement equipment, but each quantum measurement physical setting may have different measurement implementation and different measurement performance. A quantum measurement physical setting may access physical qubits stored in quantum memory, may measure them and may generate measurement results. QMaaS may use one or multiple quantum measurement physical settings, for instance, for example, based on the requirements (e.g., measurement instructions) from QMQs.

QMaaS may receive requests (e.g., QMaaS service requests, quantum measurement requests, etc.) from QMQs, other quantum nodes, and/or other QMSs. QMaaS may have multiple components, which may be all coordinated by a QMaaS Controller. For example, the QMaaS Controller may coordinate Measurement Pool Management (MPM) to manage and interact with quantum measurement pool; the QMaaS Controller may also control Quantum Memory Management (QMM) to manage quantum memory and stored physical qubits. In addition, a QMaaS Access Control (QAC), as coordinated by the QMaaS Controller, may authenticate and/or may authorize any request from other nodes such as QMQs and/or QMSs. QMQs and/or other QMSs may subscribe QMaaS from the QMS-A, which may be managed by a QMaaS Subscription component.

Other quantum nodes in FIG. 5 may be a Measurement Result Receiver (MRR) for receiving measurement results from QMS-A and/or a Quantum Measurement Proxy (QMP) for interacting with the QMS-A on behalf of QMQ.

Under the described QMaaS functional architecture in FIG. 5, a following set of QMaaS modes are described:

- Mode-1: Client-Triggered QMaaS; in this mode a QMaaS Client (QMC) may trigger to use QMaaS provided by a QMaaS Server (QMS).
- Mode-2: Source-Triggered QMaaS; in this mode a Quantum Source Node (QSN) may trigger to leverage QMaaS provided by a QMS.
- Mode-3: Receiver-Trigged QMaaS; in this mode a Quantum Destination Node (QDN) may receive qubits from a QSN and may trigger to use QMaaS provided by a QMS.

The QMaaS functional architecture described in FIG. 5 may support several QMaaS types. For each type, a QMQ may be a QMC, a QSN, a QDN, and/or another QMS, etc. Each QMaaS type may be requested and performed according to the QMaaS modes described above.

- Type-1 QMaaS: QMQ may (e.g., only) request quantum measurement as a service.
- Type-2 QMaaS: QMQ may (e.g., only) request quantum memory as a service.
- Type-3 QMaaS: QMQ may (e.g., only) request quantum measurement add memory as a service.

Figure 6:
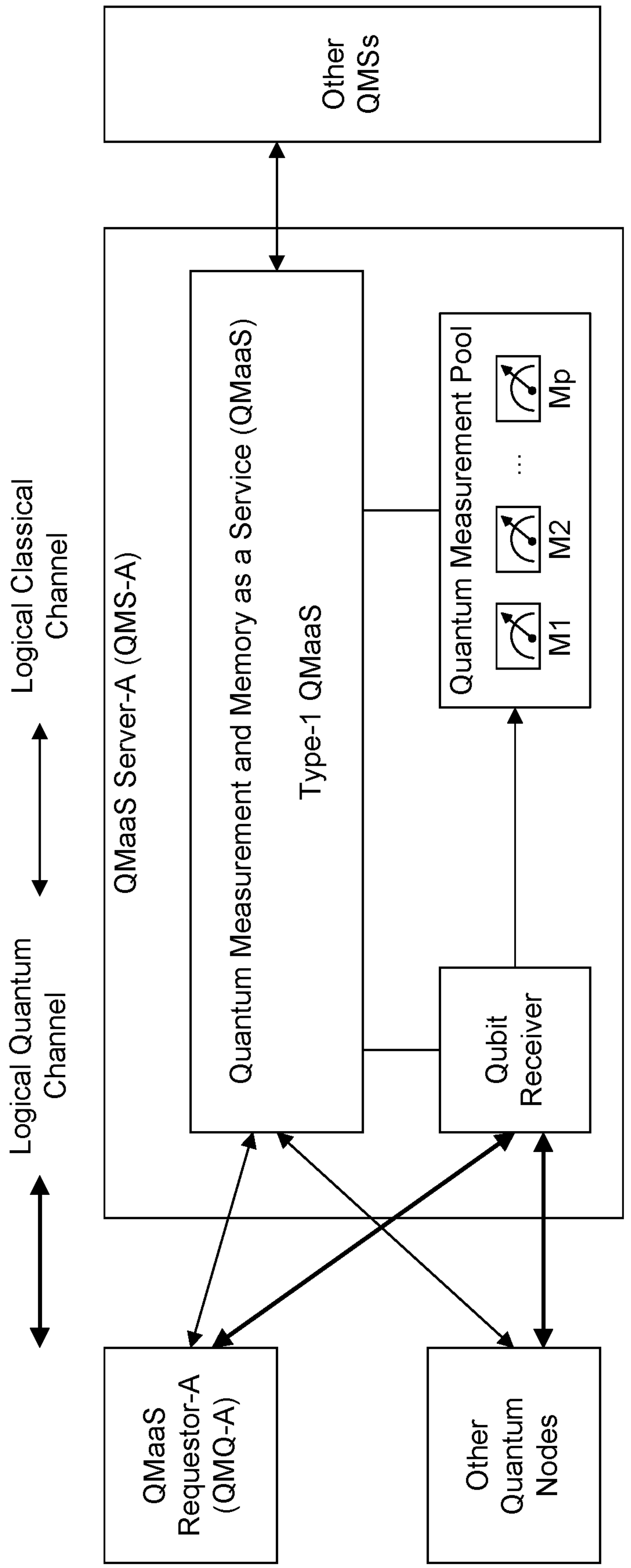

FIG. 6 illustrates Type-1 QMaaS, where a QMQ-A (e.g., a QSN or a QDN) may (e.g., only) request quantum measurement service provided by a QMS-A with the following general procedures:

Step 6a-1: The QMQ-A may send a request to the QMS-A to subscribe Type-1 QMaaS.

Step 6a-2: The QMQ-A may send some quantum measurement instructions to the QMS-A if this has not been done in step 6a-1.

Step 6a-3: The QMQ-A may send physical qubits to the QMS-A.

Step 6a-4: The QMS-A may receive the physical qubits. The QMS-A may measure the physical qubit according to quantum measurement instruction as received in step 6a-1 and/or step 6a-2. The QMS-A may generate quantum measurement results and may optionally store them locally.

Step 6a-5: The QMS-A may send a response which may optionally contain the quantum measurement results to QMQ-A or other quantum nodes.

Step 6a-6: The QMS-A may send some qubit transmission instructions back to the QMQ-A to regulate the way the QMQ-A may transmit qubits to the QMS-A. This step may occur at any time before or after the QMQ-A may (e.g., start to) send physical qubits to the QMS-A.

FIG. 6 may also support the following scenario, where the QMQ-A is a QMC-A and other quantum nodes is a QSN-A (or QDN-A). According to embodiments, a QMC-A may request Type-1 QMaaS from the QMS-A, but physical qubits may be sent from the QSN-A to the QMS-A.

Step 6b-1: The QMC-A (e.g., QMQ-A) may send a request to the QMS-A to subscribe Type-1 QMaaS.

Step 6b-2: The QMC-A may send some quantum measurement instructions to the QMS-A if this has not been done in step 6b-1.

Step 6b-3: The QMS-A may contact the QSN-A (e.g., Other Quantum Nodes in FIG. 6) for authentication and authorization of step 6b-2 or the QMS-A itself performs the authentication and authorization of step 6b-2.

Step 6b-4: The QMC-A or the QMS-A may trigger the QSN-A to send physical qubits to the QMS-A.

Step 6b-5: The QMS-A may receive the physical qubits from the QSN-A. The QMS-A may measure the physical qubit according to quantum measurement instruction as received in step 6b-1 and/or step 6b-2. The QMS-A may generate quantum measurement results and may optionally store them locally.

Step 6b-6: The QMS-A may send a response which may optionally contain the quantum measurement results to the QMC-A and/or the QSN-A.

Step 6b-7: The QMS-A may send some qubit transmission instructions back to the QSN-A to regulate the way the QSN-A may transmit qubits to the QMS-A. This step may occur as a part of step 6b-2 or at any time after step 6b-2.

Figure 7:
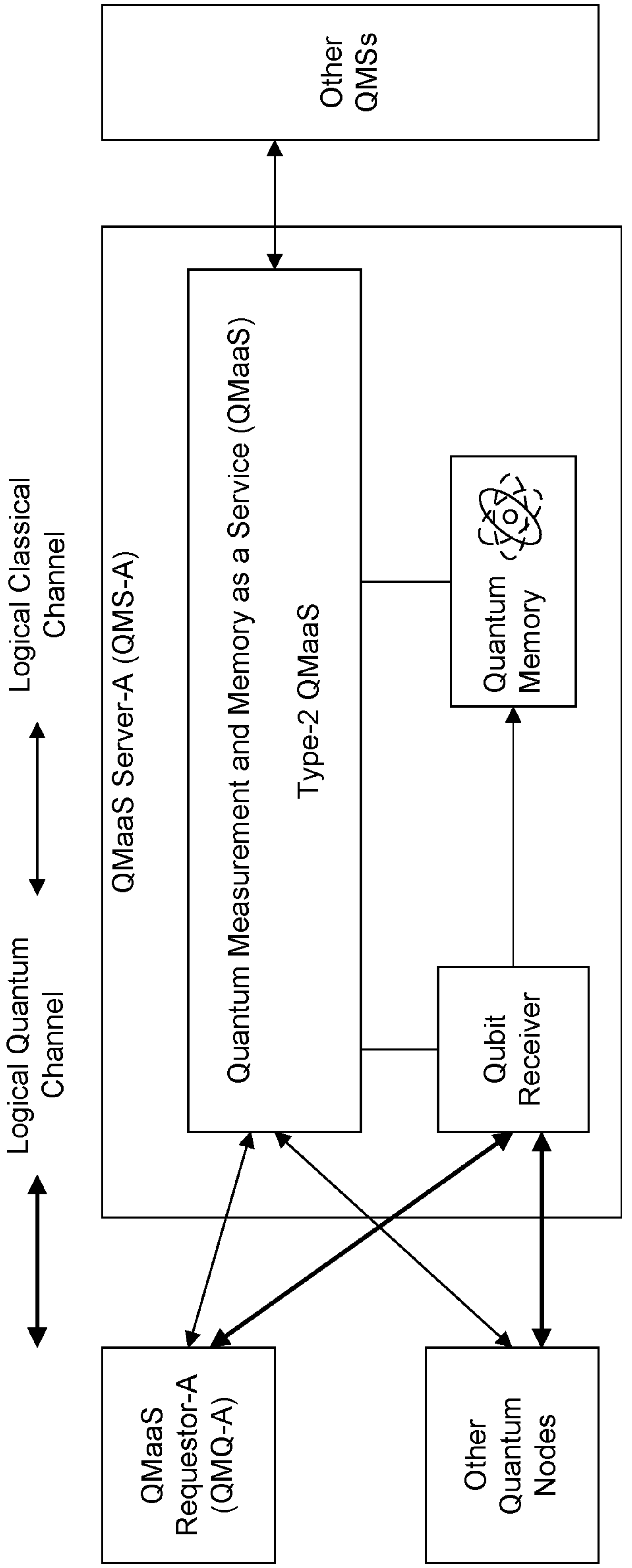

FIG. 7 illustrates Type-2 QMaaS, where a QMQ-A (e.g., a QSN or a QDN) may (e.g., only) requests quantum memory service provided by a QMS-A with the following general procedures:

Step 7a-1: The QMQ-A may send a request to the QMS-A to subscribe Type-2 QMaaS.

Step 7a-2: The QMQ-A may send physical qubits to the QMS-A.

Step 7a-3: The QMS-A may receive the physical qubits and/or may store them, for example locally, as requested by the QMQ-A in step 7a-1.

Step 7a-4: The QMS-A may send a response to the QMQ-A that may indicate the success storage of qubits in quantum memory.

Step 7a-5: The QMS-A may send some qubit transmission instructions back to the QMQ-A, for example, to regulate the way the QMQ-A transmits qubits to the QMS-A. This step may occur at any time after step 7a-1.

FIG. 7 Error! Reference source not found. may also support the following scenario, in another embodiment, where a QMQ-A may be a QMC-A and other quantum nodes may be a QSN-A (or QDN-A). According to embodiments, a QMC-A may request Type-2 QMaaS from a QMS-A, but physical qubits may be sent from the QSN-A to the QMS-A.

Step 7b-1: The QMC-A (e.g., QMQ-A) may send a request to the QMS-A to subscribe Type-2 QMaaS.

Step 7b-2: The QMS-A may contact the QSN-A (e.g., Other Quantum Nodes in FIG. 7) for authentication and authorization.

Step 7b-3: The QMC-A or the QMS-A may trigger the QSN-A to send physical qubits to the QMS-A.

Step 7b-4: The QMS-A may receive the physical qubits from the QSN-A and/or may store them, for example locally as requested by the QMC-A in step 7b-1.

Step 7b-5: The QMS-A may send a response to the QMC-A and/or the QSN-A that may indicate the success storage of qubits in quantum memory.

Step 7b-6: The QMS-A may send some qubit transmission instructions back to the QSN-A, for example, to regulate the way the QSN-A transmits qubits to the QMS-A. This step may occur at any time after step 7b-2 and/or as a part of step 7b-3.

Figure 8:
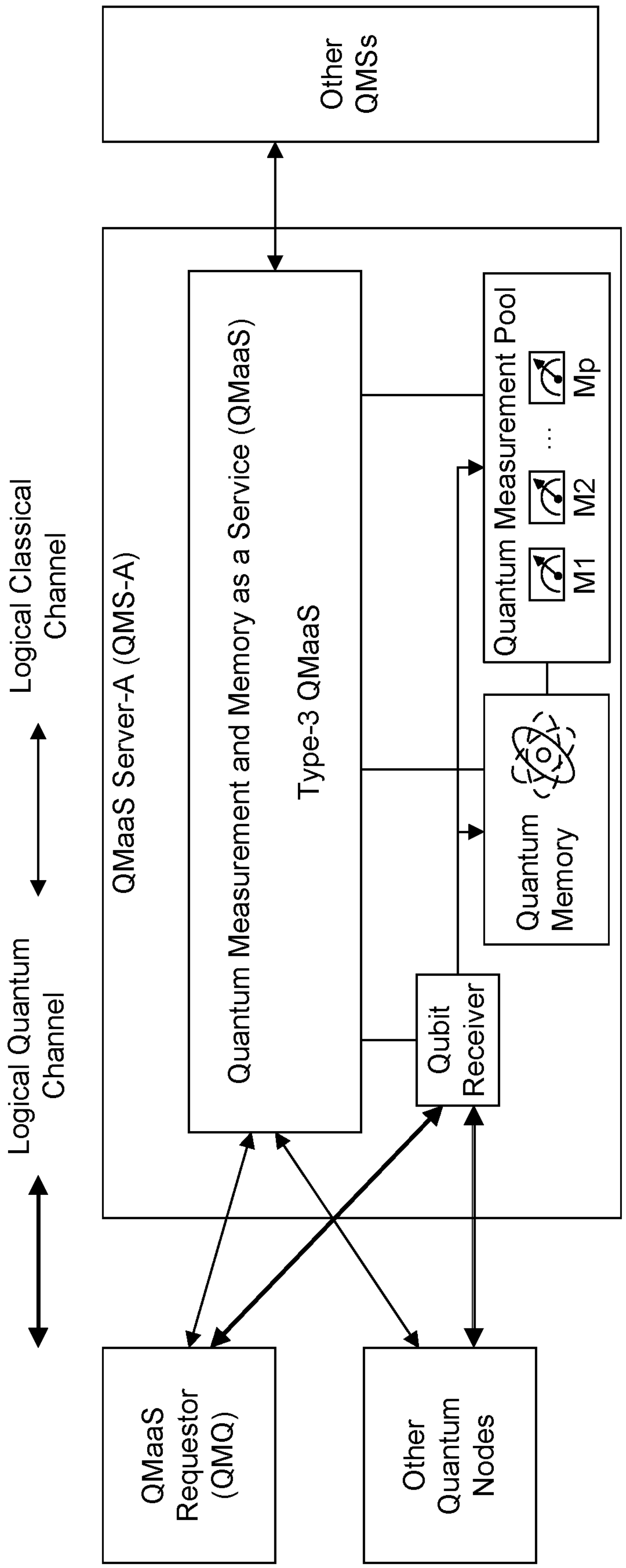

FIG. 8 illustrates Type-3 QMaaS, where a QMQ-A (e.g., a QSN or a QDN) may request quantum measurement and/or memory service provided by a QMS-A with the following general procedures:

Step 8a-1: The QMQ-A may send a request to the QMS-A to subscribe Type-3 QMaaS.

Step 8a-2: The QMQ-A may send some quantum measurement instructions to the QMS-A if this has not been done in step 8a-1.

Step 8a-3: The QMQ-A may send physical qubits to the QMS-A.

Step 8a-4: The QMS-A may receive the physical qubits and may store them, for example locally, as requested by the QMC-A in step 8a-1.

Step 8a-5: The QMS-A may measure the store physical qubit immediately or at a designated time, for example, according to quantum measurement instruction as received in step 8a-1 and/or step 8a-2. The QMS-A may generate quantum measurement results and may optionally store them locally.

Step 8a-6: The QMS-A may send a response which may optionally contain the quantum measurement results to the QMQ-A or other quantum nodes.

Step 8a-7: The QMS-A may send some qubit transmission instructions back to the QMQ-A, for example, to regulate the way the QMQ-A transmits qubits to the QMS-A. This step may occur at any time before or after the QMQ-A may (e.g., start to) send physical qubits to the QMS-A.

FIG. 8 may also support the following scenario, in certain representative embodiments, where a QMQ-A may be QMC-A and other quantum nodes may be a QSN-A (or QDN-A). According to embodiments, the QMC-A may request Type-3 QMaaS from the QMS-A, but physical qubits may be sent from the QSN-A to the QMS-A.

Step 8b-1: The QMC-A (e.g., QMQ-A) may send a request to the QMS-A to subscribe Type-3 QMaaS.

Step 8b-2: The QMC-A may send some quantum measurement instructions to the QMS-A if this has not been done in step 8b-1.

Step 8b-3: The QMS-A may contact the QSN-A (e.g., Other Quantum Nodes in FIG. 6) for authentication and authorization.

Step 8b-4: The QMC-A or the QMS-A may trigger the QSN-A to send physical qubits to the QMS-A.

Step 8b-5: The QMS-A may receive the physical qubits from the QSN-A and may store them locally as requested by the QMC-A in step 8b-1.

Step 8b-6: The QMS-A may measure the physical qubit immediately or at a designated time, for example, according to quantum measurement instruction as received in step 8b-1 and/or step 8b-2. The QMS-A may generate quantum measurement results and may optionally store them locally.

Step 8b-7: The QMS-A may send a response which may optionally contain the quantum measurement results to the QMC-A and/or the QSN-A.

Step 8b-8: The QMS-A may send some qubit transmission instructions back to the QSN-A, for example, to regulate the way the QSN-A transmits qubits to the QMS-A. This step may occur as a part of step 8b-2 or at any time after step 8b-2.

Figure 9:
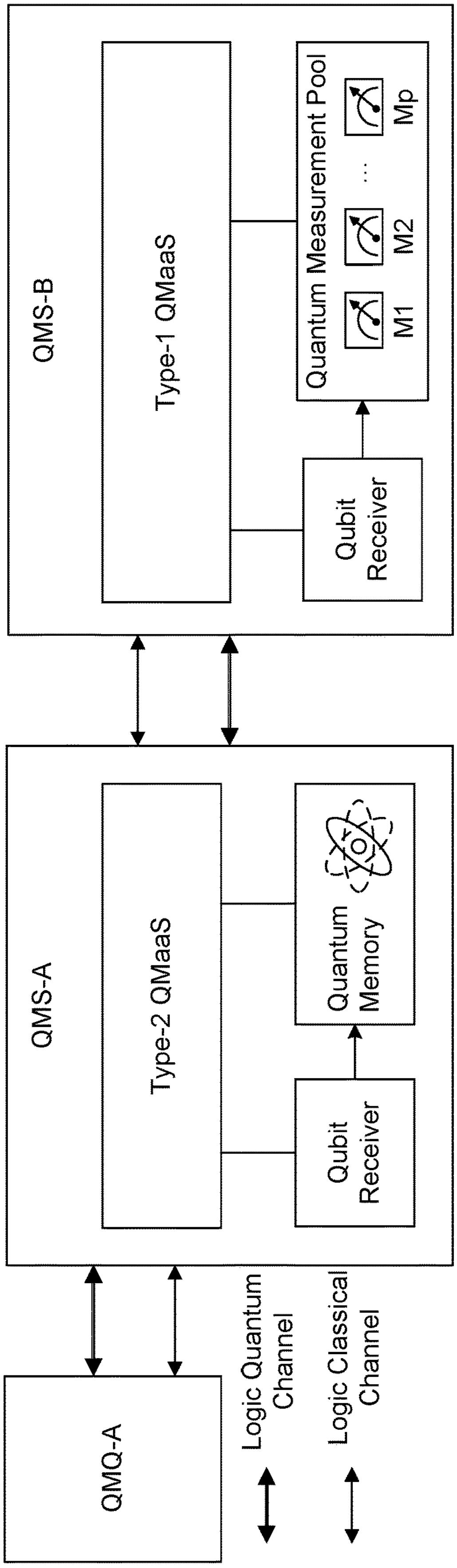

Various types of QMaaS can be cascaded and grouped together to serve a QMQ (e.g., a QSN, a QDN, a QMC). FIG. 9 illustrates an example, where a QMQ-A may require Type-3 QMaaS. But a QMS-A may (e.g., only) provides Type-2 QMaaS while a QMS-B may (e.g., only) provide Type-1 QMaaS. To meet the QMQ-A's requirement, the QMS-A may request Type-1 QMaaS from the QMS-B and may use it together with its own Type-2 QMaaS to (e.g., essentially) provide Type-3 QMaaS to the QMQ-A. As an example, the following procedure could be leveraged:

Step 9-1: The QMQ-A may send a request to the QMS-A to subscribe Type-3 QMaaS.

Step 9-2: The QMS-A may analyze the request and may come to the conclusion that the requested Type-3 QMaaS could be satisfied by the combination of its own Type-2 QMaaS and QMS-B's Type-1 QMaaS.

Step 9-3: The QMS-A may send a request to the QMS-B to subscribe Type-1 QMaaS on behalf of the QMQ-A or simply hiding QMQ-A information.

Step 9-4: The QMS-A may receive a first response from the QMS-B that may indicate the successful subscription of Type-1 QMaaS.

Step 9-5: The QMS-A may send a second response to the QMQ-A that may indicate the successful subscription of Type-3 QMaaS.

Step 9-6: The QMQ-A may send physical qubits to the QMS-A.

Step 9-7: The QMS-A may receive the physical qubits and may store them, for example locally, as requested by QMQ-A.

Step 9-8: The QMS-A may send the physical qubits to the QMS-B immediately or at a designated time, so that the QMS-B can measure them.

Step 9-9: The QMS-B may receive physical qubits from the QMS-A and/or may measure them to generate quantum measurement results.

Step 9-10: The QMS-B may send the quantum measurement results to the QMS-A.

Step 9-11: The QMS-A may forward the quantum measurement results to the QMQ-A and/or store them locally.

Figure 10:
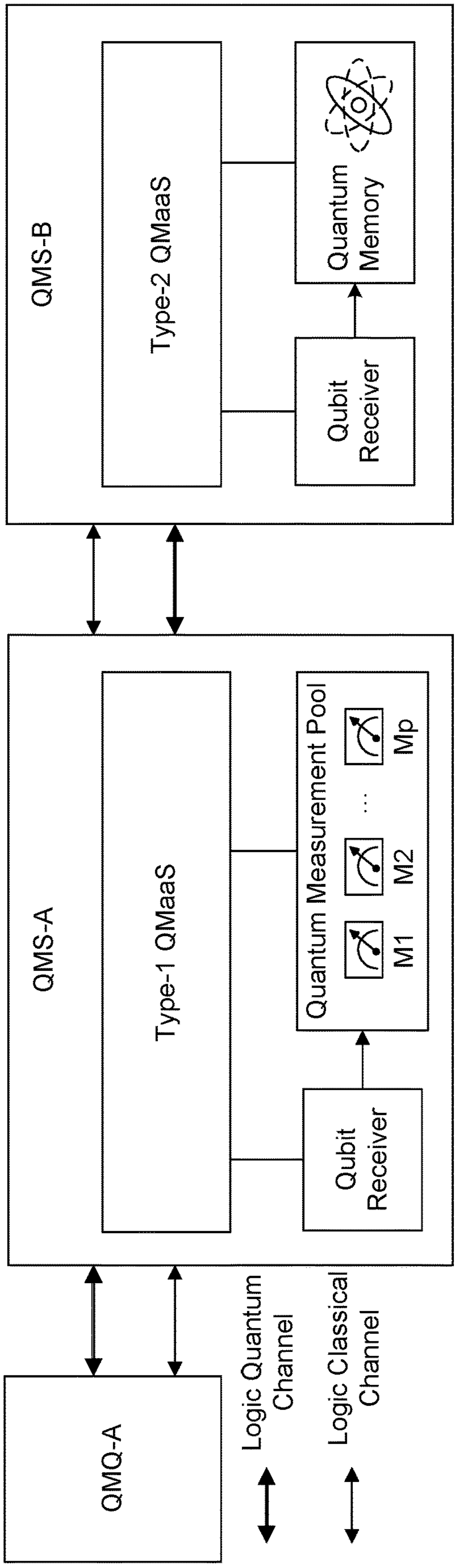

An alternative cascaded QMaaS is illustrated in FIG. 10, where the QMQ-A may (e.g., require) use Type-3 QMaaS. A QMS-A may (e.g., only) provide Type-1 QMaaS while a QMS-B may (e.g., only) provide Type-2 QMaaS. To meet the QMQ-A's (e.g., requirement) use, the QMS-A may request Type-2 QMaaS from the QMS-B and/or may use it together with its own Type-1 QMaaS to (e.g., essentially) provide Type-3 QMaaS to the QMQ-A. As an example, the following procedure could be leveraged:

Step 10-1: The QMQ-A may send a request to the QMS-A to subscribe Type-3 QMaaS.

Step 10-2: The QMS-A may analyze the request and/or may conclude that the requested Type-3 QMaaS could be satisfied by the combination of its own Type-1 QMaaS and/or QMS-B's Type-2 QMaaS Step 10-3: The QMS-A may send a request to QMS-B to subscribe Type-2 QMaaS on behalf of the QMQ-A and/or may hide QMQ-A information.

Step 10-4: The QMS-A may receive a first response from the QMS-B, that may indicate the successful subscription of Type-2 QMaaS.

Step 10-5: The QMS-A may send a second response to QMQ-A that may indicate the successful subscription of Type-3 QMaaS.

Step 10-6: The QMQ-A may send physical qubits to the QMS-A.

Step 10-7: The QMS-A may receive the physical qubits and/or may measure them to generate quantum measurement results, for example, assuming the measurement may not change the quantum state of the physical qubits.

Step 10-8: The QMA-A may send the physical qubits, for example, after the measurement to the QMS-B.

Step 10-9: The QMS-B may receive the physical qubits from the QMS-A and/or may store them, for example, locally.

Step 10-10: The QMS-A may forward the quantum measurement results to the QMQ-A and/or may store them, for example, locally.

Client-Triggered QMaaS

Basic Client-Triggered QMaaS

Figure 11:
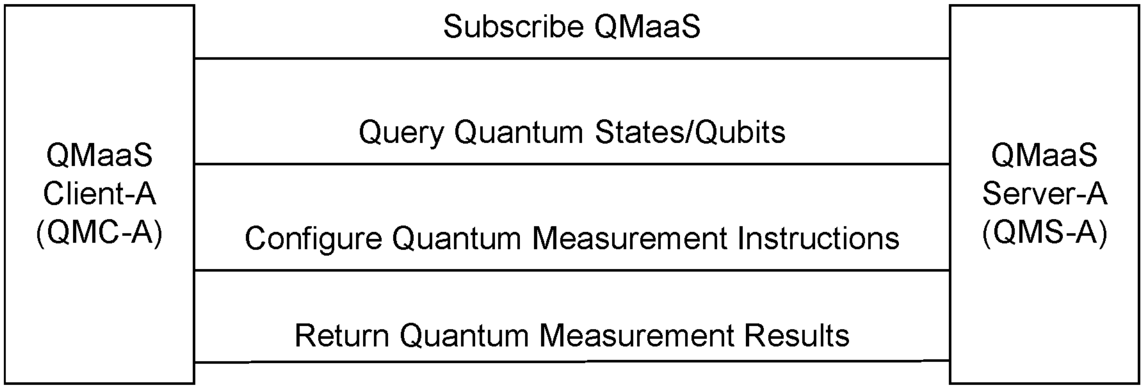
FIG. 11 illustrates an example of a Client-Triggered QMaaS architecture according to an embodiment.

In the basic client-triggered QMaaS as illustrated in FIG. 11, a QMaaS Client-A (QMC-A) may request QMaaS provided by a QMaaS Server-A (QMS-A). In general, the QMC-A first may (e.g., need to) subscribe QMaaS; in such a case the QMC-A may send requests to query physical qubits stored at the QMS-A and/or may configure the QMS-A with some quantum measurement instructions (e.g., measurement basis); the QMS-A may measure the designated physical qubits and may generate measurement results, which may be returned back to the QMC-A.

Figure 12:
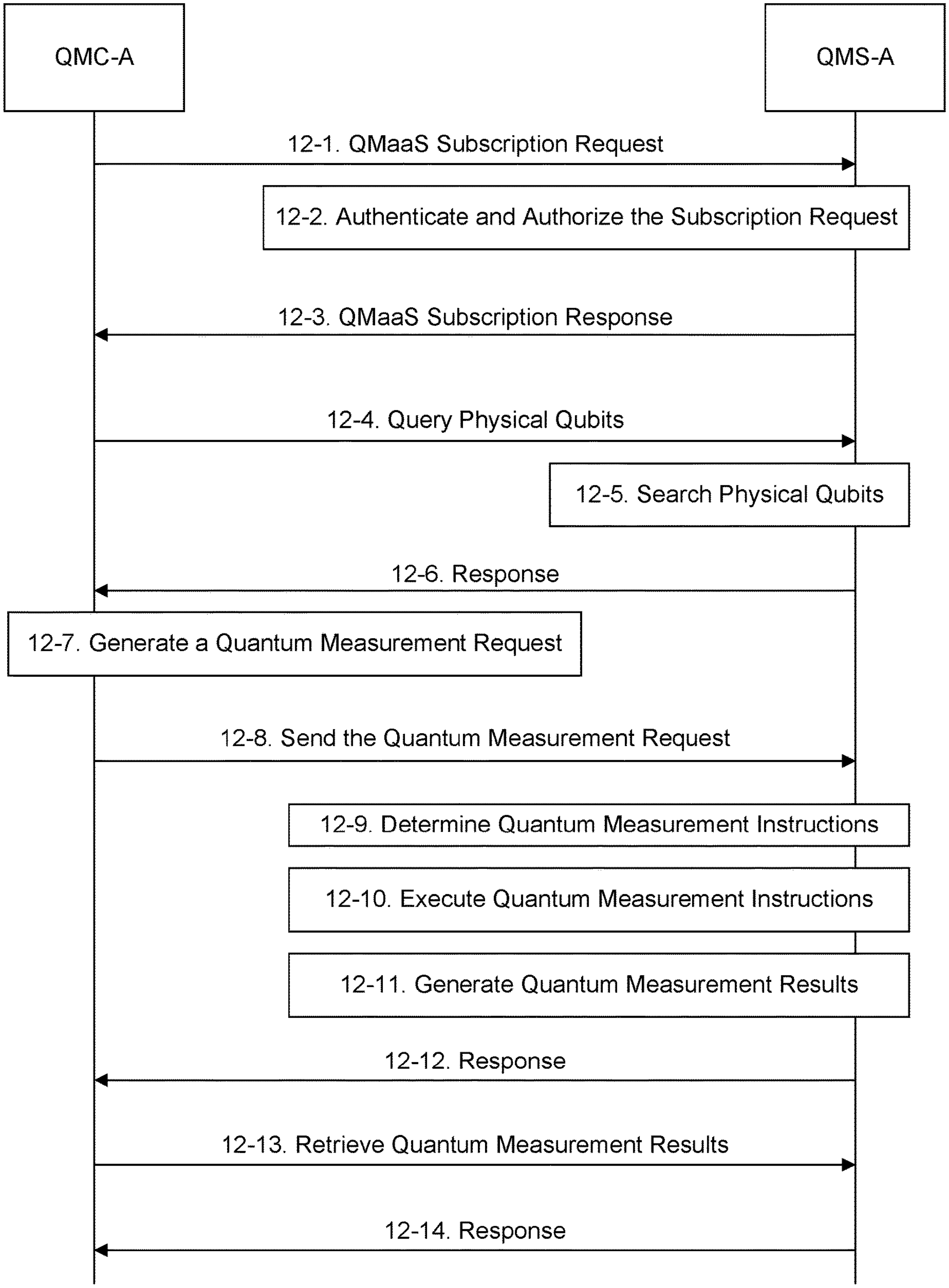
FIG. 12 is a diagram illustrating a representative procedure for a Client-Triggered QMaaS according to an embodiment.

An example of detailed procedures for basic client-triggered QMaaS are illustrated in FIG. 12.

Step 12-1: The QMC-A may send a QMaaS subscription request to the QMS-A. This subscription request may contain any of the following parameters:

QMC-ID: It may indicate the unique identifier of the QMC-A, which may be, but not limited to any of: an IP address, an email address, a fully qualified domain name, a user identifier, an application identifier, a hash of QMC-A's public key, and/or a combination of them, etc.

QMaaS Type: It may indicate the type of subscribed QMaaS, which could be: 1) Type-1: The QMC-A may (e.g., only) request quantum measurement service from the subscribed QMaaS; 2) Type-2: The QMC-A may (e.g., only) demand quantum memory service from the subscribed QMaaS; and 3) Type-3: The QMC-A may request joint quantum measurement and/or memory service from the subscribed QMaaS.

QMaaS Mode: It may indicate the mode of subscribed QMaaS. This parameter may indicate several QMaaS modes: 1) Client-Triggered QMaaS (Mode-1) where QMaaS measures designed physical qubits that have been stored in QMS-A; 2) Source-Triggered QMaaS (Mode-2) where QMaaS receives physical qubits from a Quantum Source Node (QSN) and measure them; 3) Destination-Triggered QMaaS (Mode-3) where a Quantum Destination Node (QDN) may receive physical qubits from a QSN and may forward them to QMS-A to be measured.

Expected Quantum Measurement Quality: It may indicate the expected quantum measurement quality by the QMC-A. For example, the QMC-A could indicate its requirements on measurement speed and/or measurement fidelity through this parameter.

Quantum Measurement Instructions: The QMC-A may provide some quantum measurement instructions to the QMS-A. A quantum measurement instruction may include measurement basis, requested measurement protocols, the maximum delay that quantum measurement can be delayed from the time when a qubit is received by the QMS-A (e.g., zero, 1 second, 1 minutes), if the measurement is quantum joint measurement over multiple qubits (e.g., bell state measurement) and how to identify these multiple qubits (e.g., each pair of qubits sequentially received, each pair of qubits stored in quantum memory), etc.

Measurement Result Handling: This parameter may indicate to the QMS-A how to handle measurement results. The QMC-A could request: 1) the QMS-A may send the generated measurement results back to the QMC-A; 2) the QMS-A may store the generated measurement results, for example, locally and/or may wait for the QMC-A to retrieve; and 3) the QMS-A may forward the generated measurement results to another node (e.g., Measurement Result Receiver).

Measurement Result Receiver: This parameter may (e.g., give) transmit information indicating the address that the QMS-A should forward the generated measurement results to.

Measurement Request Frequency: This parameter may indicate the frequency that the QMC-A may request the QMS-A to measure physical qubits. If the frequency is too high, the QMS-A may reject it and offer the QMC-A a lower measurement request frequency; otherwise, too frequent measurement requests may congest the QMS-A, or it is just beyond the frequency or the capability that measurement hardware can support.

Step 12-2: The QMS-A may receive the subscription request. The QMS-A may authenticate and/or may authorize the subscription request, for example, based on the parameters contained in the request such as any of QMC-ID, QMaaS Type, Measurement Request Frequency, etc. The QMS-A may approve or reject the subscription request. The authentication and authorization results (e.g., approval or rejection) may be contained in step 12-3. Some parameters (e.g., Quantum Measurement Instructions) may be stored locally at the QMS-A as a part of QMC-A's QMaaS subscription data, which may be applied to any or designed future quantum measurement request such as the one in step 12-7.

Step 12-3: The QMS-A may send a QMaaS subscription response to the QMC-A, which may contain/include the authentication and authorization results from step 12-2. The QMS-A identifier (e.g., QMS-ID) may be contained in this subscription response. Some parameters and their values contained in step 12-1 may not be fully accepted by the QMS-A; as a result, the QMS-A may approve new and different values and may contain the new values in this subscription response. For example, the QMS-A may assign a smaller Measurement Request Frequency to the QMC-A. If the QMS-A approves the QMaaS subscription request, QMS-A may assign a QMaaS identifier (e.g., Assigned-QMaaS-ID) for the QMC-A and contain Assigned-QMaaS-ID in this subscription response. The QMC-A may use Assigned-QMaaS-ID in all future interactions with the QMS-A. The Assigned-QMaaS-ID may be generated, for example, based on any of QMC-ID, QMS-ID, and/or other parameters contained in step 12-1, and/or local parameters and rules maintained by the QMS-A. The QMC-A may receive the subscription response. If its QMaaS subscription request has been approved, QMC-A may (e.g., start to) use the subscribed QMaaS.

Step 12-4: The QMC-A may send a request to the QMS-A to query any physical qubits stored at the QMS-A. The QMC-A may use this request to (e.g., make sure) check/verify that the physical qubits to be measured have been stored at the QMS-A, before sending any measurement requests to the QMS-A (e.g., in step 12-8). This request may contain any of the following parameters:

QMC-ID: It may indicate the unique identifier of the QMC-A, which could be, but not limited to any of: an IP address, a fully qualified domain name, a user identifier, an application identifier, a hash of QMC-A's public key, etc.

Assigned-QMaaS-ID: This parameter is received from step 12-3.

Qubit Query Condition: It may indicate the conditions for target physical qubits being queried. This parameter may indicate a specific address or an address range where the stored qubits are being queried. This parameter may indicate the identifier of the owner that physical qubits being queried belong to. For example, the QMC-A may query if the QMS-A has stored any physical qubits for another QMC-B; as result, this parameter may indicate the identity information about another QMC-B, which is the owner of physical qubits being queried by the QMC-A. If the QMC-A queries its own physical qubits, this parameter may not be needed or may simply be set to indicate the QMC-ID. This parameter may also indicate the age of target physical qubit; a physical qubit if being stored in quantum memory too long may have an old age and its fidelity may be reduced; as such, the QMC-A may not be interested in requesting to measure such qubits.

Step 12-5: The QMS-A may receive the query request from step 12-4 and may search its quantum memory to find any stored physical qubits which meets the qubit query condition given in step 12-4. The QMS-A may find none, one, or multiple physical qubits that meet the given qubit query condition. In such a case, the QMS-A may generate qubit query results, which may contain any of the following parameters alone:

Number of Found Qubits: It may indicate the number of found qubits matching the qubit query condition.

Qubit-ID: It may indicate the identifier of a found physical qubit, which could be the physical or logical address in the quantum memory.

Qubit-Age: It may indicate the age of a found qubit.

Qubit-Fidelity: It may indicate the estimated fidelity of a found qubit. Usually, the longer Qubit-Age, the lower Qubit-Fidelity.

Step 12-6: The QMS-A may send a response to the QMC-A containing the qubit query results generated in step 12-5.

Step 12-7: The QMC-A may (e.g., decide to) use the subscribed QMaaS to measure one or multiple queried qubits. It should be noted that if the QMS-A has known the qubits to be measured, it may skip Steps 12-4 to 12-6 before taking step 12-7. The QMC-A may generate a quantum measurement request, which may contain any of the following parameters:

- QMC-ID: It may indicate the unique identifier of the QMC-A, which could be, any of, but not limited to any of: an IP address, a fully qualified domain name, a user identifier, an application identifier, a hash of QMC-A's public key, etc.
- Assigned-QMaaS-ID: This parameter is received from step 12-3.
- Qubit-ID: It may indicate the identifier of target physical qubits to be measured.
- Quantum Measurement Instructions: The QMC-A may provide some quantum measurement instructions to the QMS-A. A quantum measurement instruction may include any of, measurement basis, requested measurement protocols, the maximum delay that quantum measurement can be delayed from the time when a qubit is received by the QMS-A (e.g., zero, 1 second, 1 minutes), if the measurement is quantum joint measurement over multiple qubits (e.g., bell state measurement) and how to identify these multiple qubits (e.g., each pair of qubits sequentially received, each pair of qubits stored in quantum memory), etc. If the QMC-A has provided this parameter in step 12-1, it may not provide it again in step 12-7; as a result, the QMS-A may leverage any appropriate stored quantum measurement instructions to measure target qubits as indicated in step 12-7.
- Measurement Result Handling: This parameter tells (e.g., transmit information indicating) to the QMS-A how to handle measurement results. The QMC-A could request that: 1) the QMS-A may send the generated measurement results back to the QMC-A; 2) the QMS-A may store the generated measurement results, for example, locally and may wait for the QMC-A to retrieve; and 3) the QMS-A may forward the generated measurement results to another node (e.g., Measurement Result Receiver). If the QMC-A has provided this parameter in step 12-1, it may not provide it again in step 12-7.
- Measurement Result Receiver: This parameter may (e.g., give) transmit information indicating the address that the QMS-A should forward the generated measurement results to. If the QMC-A has provided this parameter in step 12-1, it may not provide it again in step 12-7.

Step 12-8: The QMC-A may send the quantum measurement request to the QMS-A.

Step 12-9: The QMS-A may receive the quantum measurement request. The QMS-A may determine appropriate quantum measurement instructions, for example, based on the parameters contained in step 12-8 and QMC-A's subscription data generated and/or stored at the QMS-A as a result of step 12-2.

Step 12-10: The QMS-A may use the determined quantum measurement instructions to measure the target qubits as indicated in step 12-8.

Step 12-11: The QMS-A may generate quantum measurement results, which may be handled according to the parameter "Measurement Result Handling" as indicated in step 12-8 or step 12-1.

Step 12-12: The QMS-A may send a response to the QMC-A as a reply to the quantum measurement request in step 12-8. The content of this response may depend on the parameter "Measurement Result Handling". Overall, this response may contain the quantum measurement results and/or the address of the quantum measurement results.

The response can be securely transmitted from the QMS-A to the QMC-A. For example, the QMS-A may establish a secure session with the QMC-A for receiving the response; in such a case, the QMS-A may send the response via the established secure session to the QMC-A. According to embodiments, the QMS-A may encrypt the response with a shared key and send the encrypted response to the QMC-A; the QMC-A may receive the encrypted response and decrypt it, using the same shared key. Also, the QMS-A may use quantum secure direct communications to send the response to the QMC-A. In addition, QMS-A may use superdense coding to send the response to the QMC-A although this approach may (e.g., need to) consume shared entanglement between the QMS-A and the QMC-A. The content of the response may include any of: a quantum measurement result, an identifier of the qubits being measured, the time when the quantum measurement has been conducted, an identifier of quantum measurement instruction or setting being used, a flag indicating if the response may be kept at the QMS-A, a new sending rate of qubits that the QMS-A may (e.g., expects to) receive and may measure.

Step 12-13: If step 12-12 (e.g., only) contain/include the address of the measurement results, the QMC-A may send a request to the QMS-A to retrieve the generate quantum measurement results. This request may contain/include the address of the quantum measurement results being retrieved.

Step 12-14: The QMS-A may find the quantum measurement results, for example, based on the address given in step 12-13. the QMS-A may send a response containing the quantum measurement results to the QMC-A.

Client-Triggered QMaaS for Quantum Source Node

Figure 13:
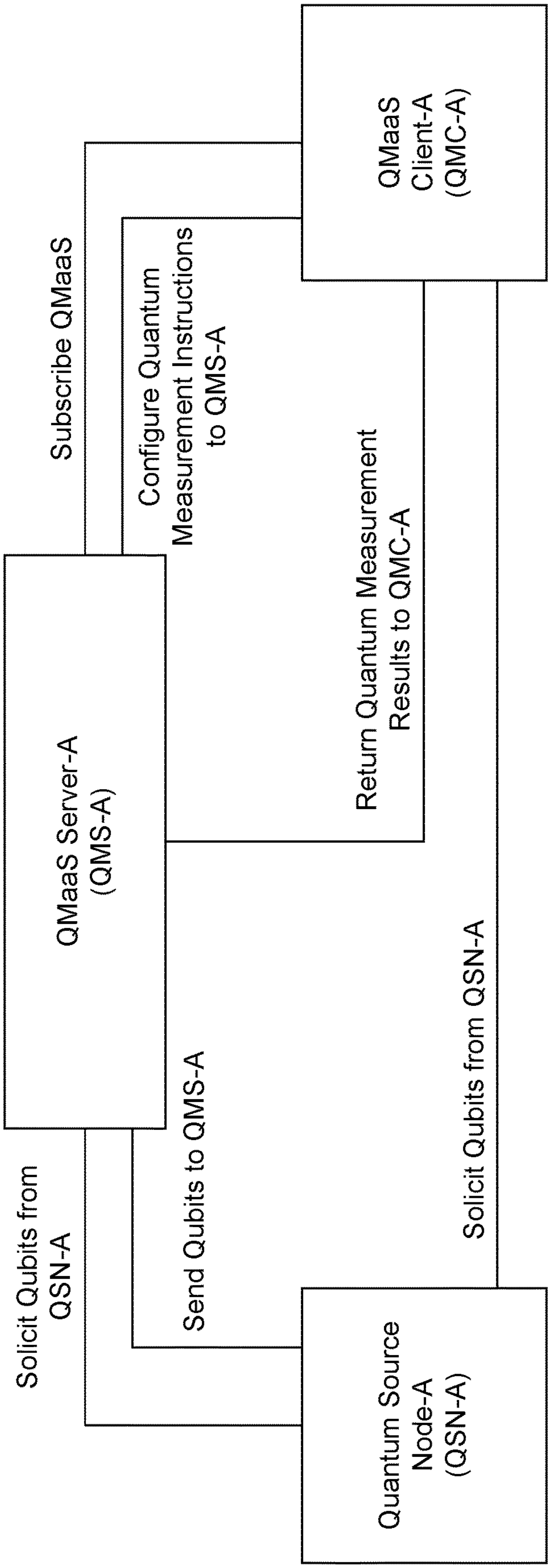
FIG. 13 illustrates an example of a Client-Triggered QMaaS for Quantum Source Node architecture according to an embodiment.

FIG. 13 illustrates client-triggered QMaaS for a Quantum Source Node-A (QSN-A). According to embodiments, a QMaaS Client-A (QMC-A) may subscribe QMaaS from a QMaaS Server-A (QMS-A). The QMC-A may also configure certain quantum measurement instructions to the QMS-A. After that, either the QMC-A or the QMS-A may instruct the QSN-A to send physical qubits to the QMS-A for QMaaS (e.g., Type-1, Type-2, or Type-3). The QMS-A may receive physical qubits from the QSN-A, may measure and/or store them according to the QMaaS subscribed by the QMC-A, may generate quantum measurement results, and/or may send the generated quantum measurement results to the QMC-A (or the QSN-A). According to embodiments, the QMC-A (or the QSN-A) may actively retrieve the quantum measurement results from the QMS-A.

Figure 14:
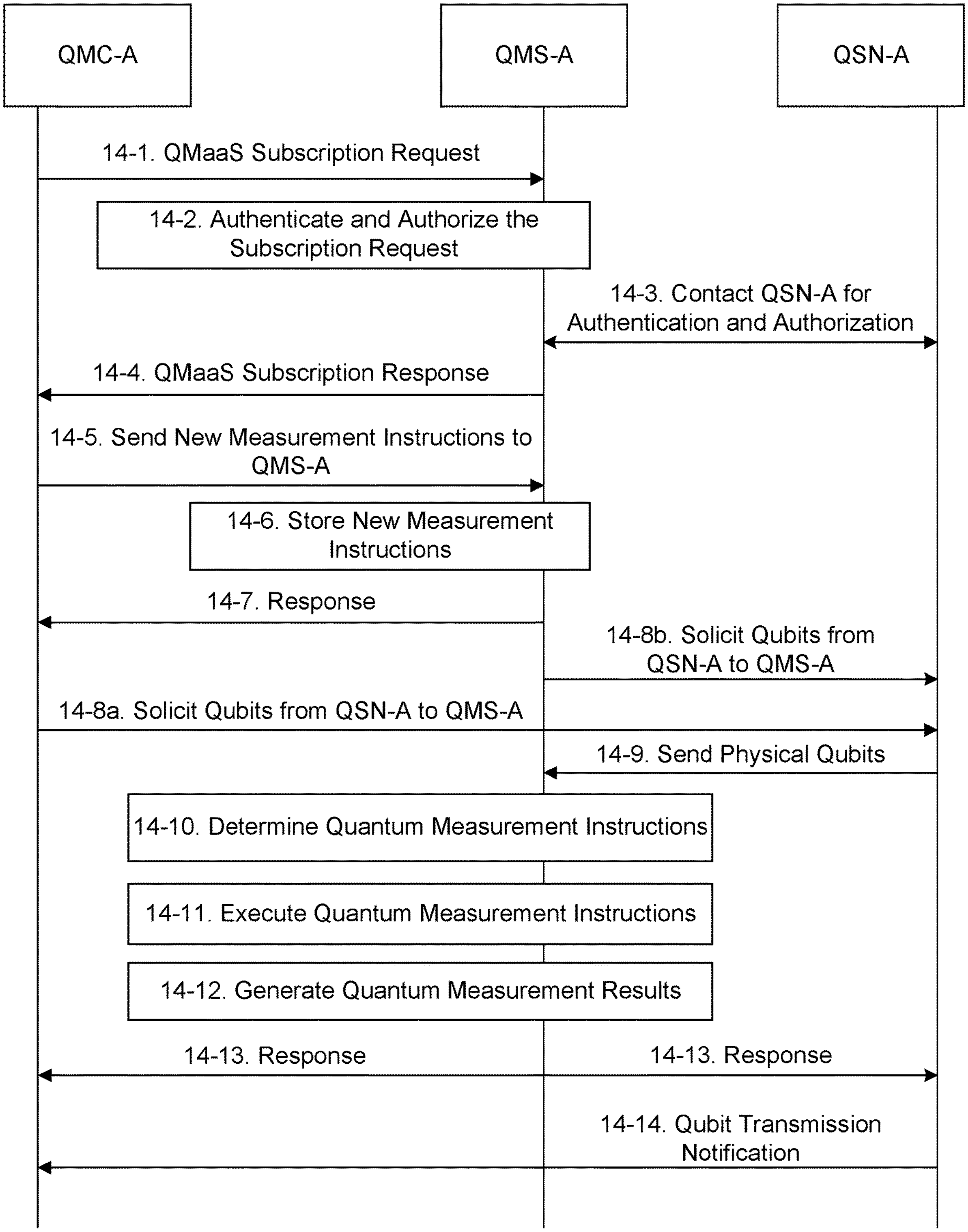
FIG. 14 is a diagram illustrating a representative procedure for a Client-Triggered QMaaS for Quantum Source Node according to an embodiment.

An example of detailed procedures for client-triggered QMaaS for quantum source node are shown in FIG. 14 with the following steps:

- Step 14-1: A QMC-A may send a request to a QMS-A to subscribe QMaaS provided by the QMS-A. This step may be similar to step 12-1 of the previous embodiment described in FIG. 12. In addition, this request may contain the following extra parameters besides the ones included in step 12-1 of embodiment described in FIG. 12:
  - QSN-ID: The identifier of the QSN-A, which may be any of, but not limited to any of: an IP address, a fully qualified domain name, an email address, an application address, and/or a combination of them, etc.

QSN Credential: The credentials of the QSN-A, which may be any of, but not limited to any of: The public key of the QSN-A, a certificate of the QSN-A, a hashed value if QSN-A's public key, etc.

Qubit Transmission Rate: This parameter may indicate the rate that the QSN-A may send qubits to the QMS-A for measurement. If the Qubit Transmission Rate is too high, QMS-A may reject it and offer the QSN-A a lower Qubit Transmission Rate; otherwise, a high Qubit Transmission Rate may congest the QMS-A, or it is just beyond the capability that QMS-A's memory and/or measurement hardware can support.

Step 14-2: The QMS-A may authenticate and/or may authorize the subscription request from step 14-1; this step may be similar to the previous embodiment described in step 12-2 of FIG. 12. A difference may be that the QMS-A may incorporate QSN-A's identifier and credentials into the authentication and authorization process; as a result, the QMS-A may contact the QSN-A for the purpose of authentication and authorization.

Step 14-3: The QMS-A may send a request to the QSN-A to check its availability and also further authenticate/authorize the QMaaS subscription request from step 14-1. This request may contain QSN-A's identifier and credentials as received from step 14-1; this request may also contain other parameters from step 14-1 such as QMC-ID and/or Qubit Transmission Rate. The QSN-A may receive this request and verifies its identifier and credentials. If they are correct and/or the QSN-A also agrees on other parameters contained in this request, the QSN-A may send an authorization/authentication approval to the QMS-A; otherwise, the QSN-A may send an authorization/authentication rejection to the QMS-A.

Step 14-4: The QMS-A may receive a response from the QSN-A. It may generate a new response and may send the new response back to the QMC-A; this step is similar to step 12-3 of the embodiment described in FIG. 12. A difference is that the QMS-A may indicate in this new response: 1) whether the QMS-A may (e.g., need to) contact the QSN-A in Step 8b; and/or 2) whether the QMC-A may (e.g., need to) contact the QSN-A in step 14-8a.

Step 14-5: The QMC-A may use this step to send new measurement instructions to the QMS-A, which may be done jointly with step 14-1 and/or be performed any time after step 14-8a or step 14-13. The QMC-A may (e.g., decide to) change measurement instructions and/or other parameters as contained in step 14-1. For example, the QMC-A may send some new quantum measurement instructions to the QMS-A. This message may contain any of the following parameters:

QSN-ID: It may indicate the unique identifier of a new QSN, which may send physical qubits to QMS-A to be measured and/or stored.

QSN Credential: The credentials of the QSN-A, which may be any of, but not limited to any of: The public key of the QSN-A, a certificate of the QSN-A, a hashed value if QSN-A's public key, etc.

Assigned-QMaaS-ID: The assigned QMaaS identifier that the QMS-A may send to the QMC-A in step 14-4.

Quantum Measurement Instructions: The QMC-A may provide some new quantum measurement instructions to the QMS-A. A quantum measurement instruction may include any of: measurement basis, requested measurement protocols, the maximum delay that quantum measurement can delay from the time when a qubit is received by the QMS-A (e.g., zero, 1 second, 1 minutes), if the measurement is quantum joint measurement over multiple qubits (e.g., bell state measurement) and how to identify these multiple qubits (e.g., each pair of qubits sequentially received, each pair of qubits stored in quantum memory), etc.

Measurement Result Handling: This parameter tells (e.g., transmit information indicating) to the QMS-A how to handle measurement results. The QMC-A may request that: 1) the QMS-A may send the generated measurement results back to QMC-A and/or QSN-A; 2) the QMS-A may store the generated measurement results, for example, locally and/or may wait for the QMC-A and/or the QSN-A to retrieve; and 3) the QMS-A may forward the generated measurement results to another node (e.g., a Measurement Result Receiver (MRR)).

Measurement Result Receiver: This parameter may (e.g., give) transmit information indicating the address that the QMS-A should forward the generated measurement results to.

Step 14-6: The QMS-A may receive and/or may store the new measurement instructions, for example locally. If a new QSN-B is contained in the received new measurement instructions, the QMS-A may contact the new QSN-B for authentication and/or authorization, which may be similar to step 14-3.

Step 14-7: The QMS-A may send a response to the QMC-A indicating any of: 1) whether the new measurement instructions have been successful received; 2) whether the new measurement instructions have been approved; and/or 3) the reasons for rejecting any new measurement instruction.

Step 14-8a: According to the decision that may be contained in step 14-4, the QMC-A may send a request to the QSN-A to trigger the QSN-A to send physical qubits to the QMS-A. This step may contain some qubit generation and transmission instructions (e.g., qubit generation rate, qubit generation basis, qubit transmission rate), which the QSN-A may follow in order to send qubits to the QMS-A in step 14-9.

Step 14-8b: According to the decision contained in step 14-4, the QMS-A may send a request to the QSN-A to trigger the QSN-A to send physical qubits to the QMS-A. This step may contain some qubit generation and transmission instructions (e.g., qubit generation rate, qubit generation basis, qubit transmission rate), which the QSN-A may follow in order to send qubits to the QMS-A in step 14-9.

Step 14-9: According to the request from step 14-8a or step 14-8b, the QSN-A may generate physical qubits and send them to the QMS-A.

Step 14-10: The QMS-A may receive qubits from the QSN-A. The QMS-A may determine appropriate QMaaS type and quantum measurement instructions based on QMC-A's subscription data as generated and stored at the QMS-A as a result of step 14-2 and or step 14-6.

Step 14-11: The QMS-A may use the determined QMaaS type to store the qubits and/or use the determined quantum measurement instructions to measure the received qubits.

Step 14-12: The QMS-A may generate quantum measurement results, which may be handled according to the parameter "Measurement Result Handling" as indicated in step 14-6 or step 14-1.

Step 14-13: The QMS-A may send a response to the QMC-A (and/or the QSN-A). The content of this response may depend on the parameter "Measurement Result Handling". Overall, this response may contain the quantum measurement results and/or the address of the quantum measurement results.

The response may be securely transmitted from the QMS-A to the QMC-A. For example, the QMS-A may establish a secure session with the QMC-A for receiving the response; in such a case, the QMS-A may send the response via the established secure session to the QMC-A. According to embodiments, the QMS-A may simply encrypt the response with a shared key and/or may send the encrypted response to the QMC-A; the QMC-A may receive the encrypted response and/or may decrypt it using the same shared key. Also, the QMS-A may use quantum secure direct communications to send the response to the QMC-A. In addition, the QMS-A may use super-dense coding to send the response to the QMC-A although this approach may (e.g., need to) consume shared entanglement between the QMS-A and the QMC-A. The content of the response may include any of: a quantum measurement result, an identifier of the qubits being measured, the time when the quantum measurement has been conducted, an identifier of quantum measurement instruction or setting being used, a flag indicating if the response may be kept at the QMS-A, a new sending rate of qubits that the QMS-A expects to receive and can measure.

Step 14-14: The QSN-A may send a notification to the QMC-A to inform it of qubit transmission statistics (e.g., how many qubits have been sent to the QMS-A, how many qubits have been successfully stored in the QMS-A, how many qubits have been successfully stored and/or measured by the QMS-A). The QSN-A may send the notification to the QMC-A at any time after step 14-9.

Source-Triggered QMaaS

Basic Source-Triggered QMaaS

Figure 15:
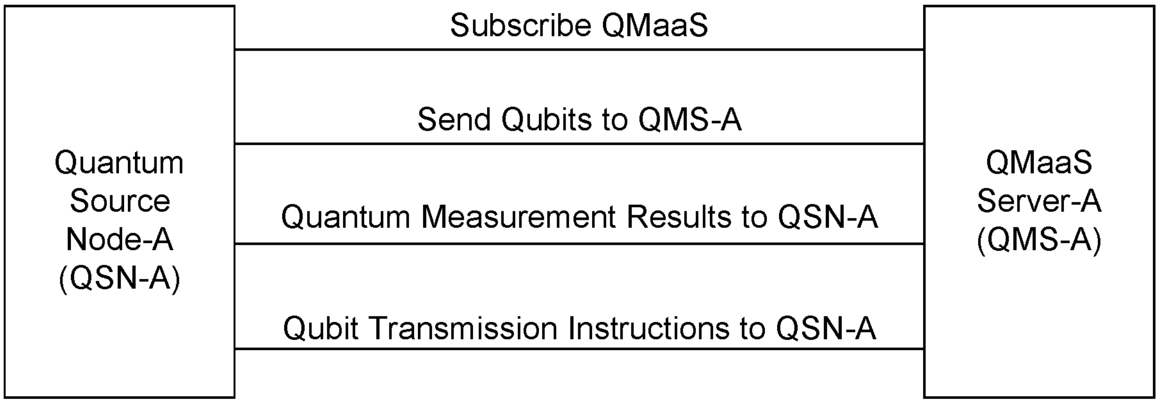
FIG. 15 illustrates an example of a Source-Triggered QMaaS architecture according to an embodiment.

The basic source-Triggered QMaaS is illustrated in FIG. 15. A Quantum Source Node-A (QSN-A) first subscribe QMaaS from a QMaaS Server-A (QMS-A). In such a case, the QSN-A may send physical qubits (e.g., photons) to the QMS-A. The QMS-A may receive the physical qubits from the QSN-A, may store and/or measure them according to the subscribed QMaaS, and may generate measurement results. At last, the QMS-A may send measurement results back to the QSN-A. Optionally, the QMS-A may configure the way the QSN-A transmit qubits to the QMS-A.

Figure 16:
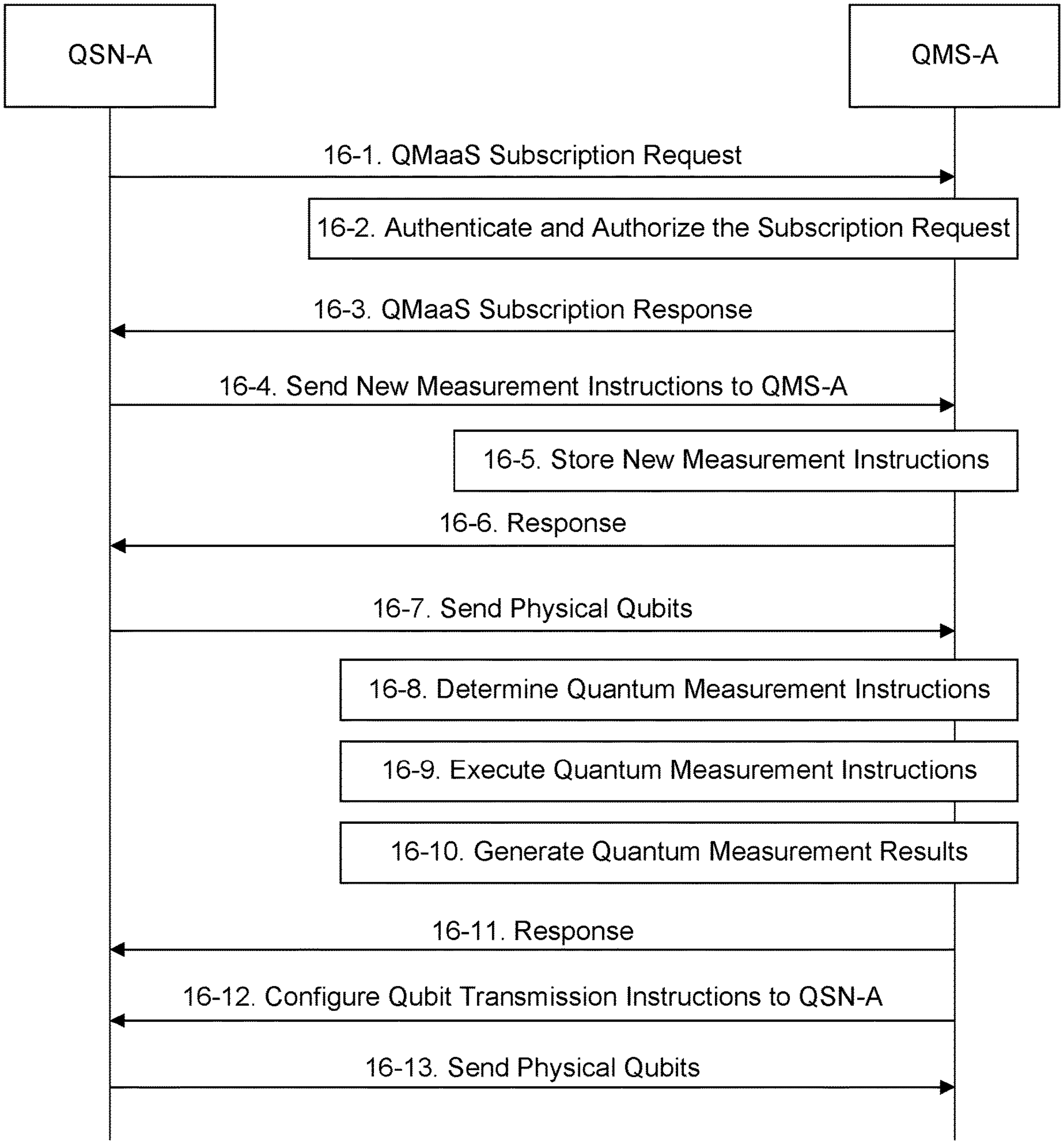
FIG. 16 is a diagram illustrating a representative procedure for a Source-Triggered QMaaS according to an embodiment.

FIG. 16 illustrates an example of detailed procedures for the basic source-triggered QMaaS with the following steps:

Step 16-1: The QSN-A may send a QMaaS subscription request to the QMS-A. This subscription request may contain any of the following parameters:

QSN-ID: It may indicate the unique identifier of the QSN-A, which could be, but not limited to any of an IP address, a fully qualified domain name, a user identifier, an application identifier, a hash of QSN's public key, etc.

QMaaS Type: It may indicate the type of subscribed QMaaS, which could be any of: 1) Type-1: The QSN-A may (e.g., only) request quantum measurement service from the subscribed QMaaS; 2) Type-2: The QSN-A may (e.g., only) demand quantum memory service from the subscribed QMaaS; and 3) Type-3: The QSN-A may request joint quantum measurement and memory service from the subscribed QMaaS.

QMaaS Mode: It may indicate the mode of subscribed QMaaS. This parameter may indicate several QMaaS modes: 1) Client-Triggered QMaaS (Mode-1) where QMaaS may measure designed physical qubits that have been stored in QMS-A; 2) Source-Triggered QMaaS (Mode-2) where QMaaS may receive physical qubits from a QSN and measure them; 3) Destination-Triggered QMaaS (Mode-3) where a Quantum Destination Node (QDN) may receive physical qubits from a QSN and may forward them to the QMS-A to be measured.

Expected Quantum Measurement Quality: It may indicate the expected quantum measurement quality by the QSN-A. For example, the QSN-A may indicate its requirements on measurement speed and measurement fidelity through this parameter.

Quantum Measurement Instructions: The QSN-A may provide some quantum measurement instructions to the QMS-A. A quantum measurement instruction may include any of measurement basis, requested measurement protocols, the maximum delay that quantum measurement can delay from the time when a qubit is received by the QMS-A (e.g., zero, 1 second, 1 minutes), if the measurement is quantum joint measurement over multiple qubits (e.g., bell state measurement) and how to identify these multiple qubits (e.g., each pair of qubits sequentially received, each pair of qubits stored in quantum memory), etc.

Measurement Result Handling: This parameter tells (e.g., transmit information indicating) to the QMS-A how to handle measurement results. The QSN-A may request any of: 1) the QMS-A may send the generated measurement results back to the QSN-A; 2) the QMS-A may store the generated measurement results, for example, locally and/or may wait for the QSN-A to retrieve; and 3) the QMS-A may forward the generated measurement results to another node (e.g., a Measurement Result Receiver (MRR)).

Measurement Result Receiver: This parameter may (e.g., give) transmit information indicating the address that the QMS-A should forward the generated measurement results to.

Qubit Transmission Rate: This parameter may indicate the rate that the QSN-A may send qubits to the QMS-A for measurement. If the Qubit Transmission Rate is too high, the QMS-A may reject it and offer the QSN-A a lower Qubit Transmission Rate; otherwise, a high Qubit Transmission Rate may congest the QMS-A, or it may be just beyond the capability that QMS-A's measurement hardware may support.

Allowed QMQs: The parameter may indicate a list of QMQs that can access and/or manipulate qubits that the QSN-A may send to and store to the QMS-A via step 16-7. For example, an allowed QMQ at a later time may send a request to the QMS-A to query these stored qubits and may even request the QMS-A to measure them. On the contrary, any other QMQs not included in this parameter may not be allowed to perform these operations on any QSN-A's qubits stored at the QMS-A.

Step 16-2: The QMS-A may receive the subscription request. The QMS-A may authenticate and/or may authorize the subscription request, for example, based on the parameters contained in the request such as any of QMS-ID, QMaaS Type, Qubit Transmission Rate, etc. The QMS-A may approve or reject the subscription request. The authentication and authorization results (e.g., approval or rejection) may be contained in step 16-3. Some parameters (e.g., Quantum Measurement Instructions) may be stored locally at the QMS-A as a part of QSN-A's QMaaS subscription data, which may be applied to measure any or designed qubits being transmitted from the QSN-A to the QMS-A (e.g., step 16-7 and/or step 16-13).

Step 16-3: The QMS-A may send a QMaaS subscription response to QSN-A, which may contain/include the authentication and authorization results from step 16-2. A QMS-A identifier (e.g., QMS-ID) may be contained in this subscription response. Some parameters and their values contained in step 16-1 may not be fully accepted by the QMS-A; as a result, the QMS-A may approve new and different values and may contain/include the new values in this subscription response. For example, the QMS-A may assign a smaller Qubit Transmission Rate to the QSN-A. If the QMS-A approves the QMaaS subscription request, the QMS-A may assign a QMaaS identifier (e.g., Assigned-QMaaS-ID) for the QSN-A and contain/include Assigned-QMaaS-ID in this subscription response. The QSN-A may use Assigned-QMaaS-ID in all future interactions with the QMS-A. The Assigned-QMaaS-ID may be generated, for example, based on any of QSN-ID, QMS-ID, other parameters contained in step 16-1, and/or local parameters and rules maintained by the QMS-A. The QSN-A may receive the subscription response. If its QMaaS subscription request has been approved, the QSN-A may (e.g., start to) use the subscribed QMaaS.

Step 16-4: before sending any physical qubits to the QMS-A, the QSN-A may (e.g., decide to) change measurement instructions and/or other parameters as contained in step 16-1. For example, the QSN-A may send some new quantum measurement instructions to the QMS-A. This message may any of the following parameters:

- QSN-ID: It may indicate the unique identifier of the QSN-A, which could be, but not limited to any of: an IP address, a fully qualified domain name, a user identifier, an application identifier, a hash of QSN-A's public key, etc.
- Assigned-QMaaS-ID: The assigned QMaaS identifier that the QMS-A may assign to the QSN-A in step 16-2.
- Quantum Measurement Instructions: The QSN-A may provide some new quantum measurement instructions to the QMS-A. A quantum measurement instruction may include measurement basis, requested measurement protocols, the maximum delay that quantum measurement can delay from the time when a qubit is received by the QMS-A (e.g., zero, 1 second, 1 minutes), if the measurement is quantum joint measurement over multiple qubits (e.g., bell state measurement) and how to identify these multiple qubits (e.g., each pair of qubits sequentially received, each pair of qubits stored in quantum memory), etc.
- Measurement Result Handling: This parameter tells (e.g., transmit information indicating) to the QMS-A how to handle measurement results. The QSN-A could request that: 1) the QMS-A may send the generated measurement results back to QSN-A; 2) the QMS-A may store the generated measurement results, for example, locally and/or may wait for the QSN-A to retrieve; and 3) the QMS-A may forward the generated measurement results to another node (e.g., a Measurement Result Receiver (MRR)).
- Measurement Result Receiver: This parameter may (e.g., give) transmit information indicating the address that the QMS-A may forward the generated measurement results to.

Step 16-5: The QMS-A may receive the message from step 16-4. The QMS-A may store the parameters contained in step 16-4 to QSN-A's QMaaS subscription data, as denoted/indicated by Assigned-QMaaS-ID.

Step 16-6: The QMS-A may send a response to the QSN-A, which may indicate if the parameters (e.g., new quantum measurement instructions) contained in step 16-4 have been successfully processed and/or stored. Steps 16-4 to 16-6 may be optional.

Step 16-7: The QSN-A may send physical qubits to the QMS-A to be measured. The QSN-A may keep sending qubits to the QMS-A according to "Qubit Transmission Rate" as approved by the QMS-A in step 16-2; the QSN-A may know the approved "Qubit Transmission Rate" from step 16-3.

Step 16-8: The QMS-A may receive the physical qubits from the QSN-A. The QMS-A may determine the subscribed QMaaS type and/or appropriate quantum measurement instructions, for example, based on the parameters contained in step 4 and QMC's subscription data generated and/or stored at the QMS-A as a result of step 16-2.

Step 16-9: The QMS-A may use the determined QMaaS type to store the physical qubit and/or use the determined quantum measurement instructions to measure the physical qubits received from step 7.

Step 16-10: The QMS-A may generate quantum measurement results, which may be handled according to the parameter "Measurement Result Handling" as indicated in step 16-4 or step 16-1.

Step 16-11: The QMS-A may send a response to the QSN-A. The content of this response may depend on the parameter "Measurement Result Handling". This response may contain the quantum measurement results and/or the address of the quantum measurement results. If the response (e.g., only) contain/include the address of the quantum measurement results, the QSN-A may use this address to retrieve the quantum measurement results from the QMS-A later.

The response can be securely transmitted from the QMS-A to the QSN-A. For example, the QMS-A may establish a secure session with the QSN-A for receiving the response; in such a case, the QMS-A may send the response via the established secure session to the QSN-A. According to embodiments, the QMS-A may simply encrypt the response with a shared key and/or may send the encrypted response to the QSN-A; the QSN-A may receive the encrypted response and/or may decrypt it using the same shared key. Also, the QMS-A may use quantum secure direct communications to send the response to the QSN-A. In addition, the QMS-A may use superdense coding to send the response to the QSN-A although this approach may (e.g., need to) consume shared entanglement between the QMS-A and the QSN-A. The content of the response may include any of: a quantum measurement result, an identifier of the qubits being measured, the time when the quantum measurement has been conducted, an identifier of quantum measurement instruction or setting being used, a flag indicating if the response may be kept at the QMS-A, a new sending rate of qubits that the QMS-A may expect to receive and can measure.

Step 16-12: since the QSN-A may keep sending physical qubits to the QMS-A like in step 16-7, the QMS-A may (e.g., decide to) reduce (or increase) Qubit Transmission Rate from the QSN-A. For example, if the QMS-A detects a lowered measurement speed or fidelity, the QMS-A may (e.g., decide to) decrease the Qubit Transmission Rate from the QSN-A. For this purpose, the QMS-A may send a request to the QSN-A to configure a new qubit transmission rate (and/or other parameters) for the QSN-A. Basically, this request may regulate and/or instruct how the QSN-A may transmit physical qubits to the QMS-A in future.

Step 16-13: The QSN-A may receive new qubit transmission rate and/or related instructions from the QMS-A from step 16-12. The QSN-A may follow (e.g., transmit information indicating) the new qubit transmit rate to transmit physical qubit to the QMS-A; the QMS-A may take steps 16-8 to 16-12 to measure any received physical qubits and/or may send a response to the QSN-A.

Source-Triggered QMaaS through Trusted Quantum Node

Figure 17:
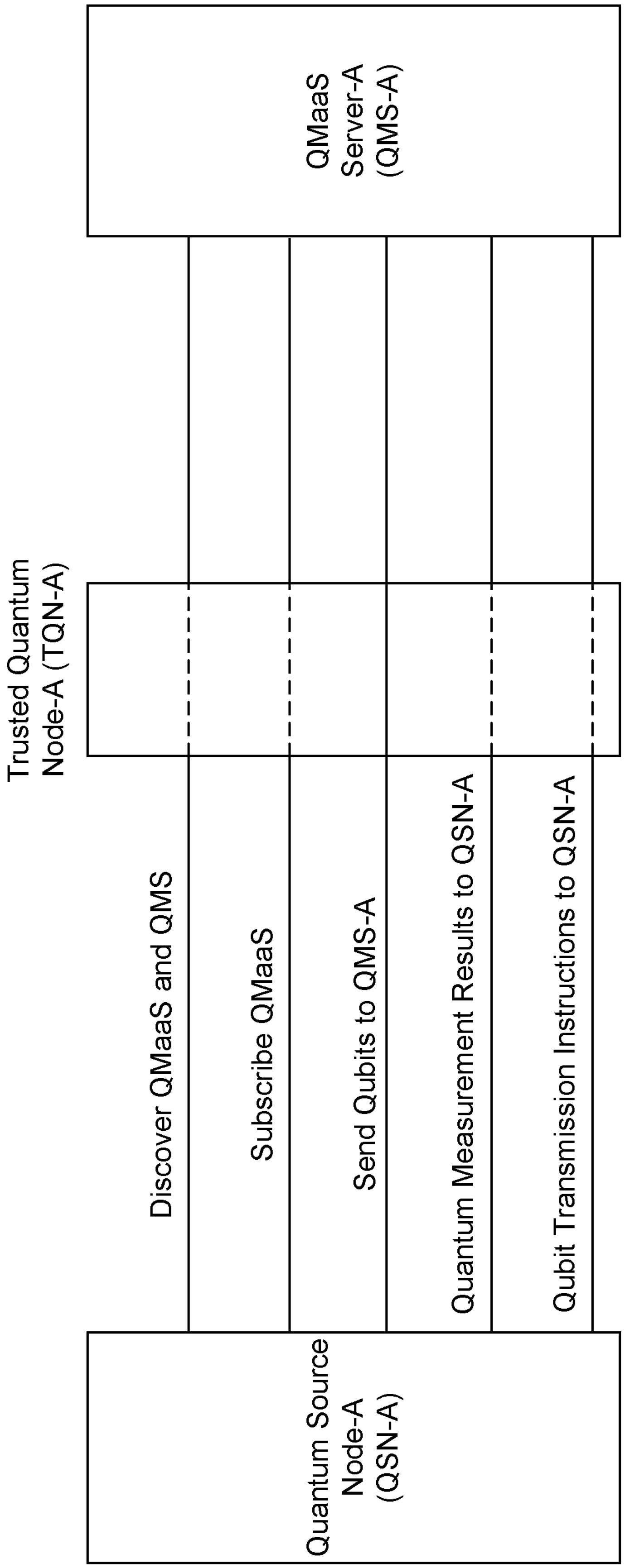
FIG. 17 illustrates an example of a Source-Triggered QMaaS through Trusted Quantum Node architecture according to an embodiment.
Figure 18:
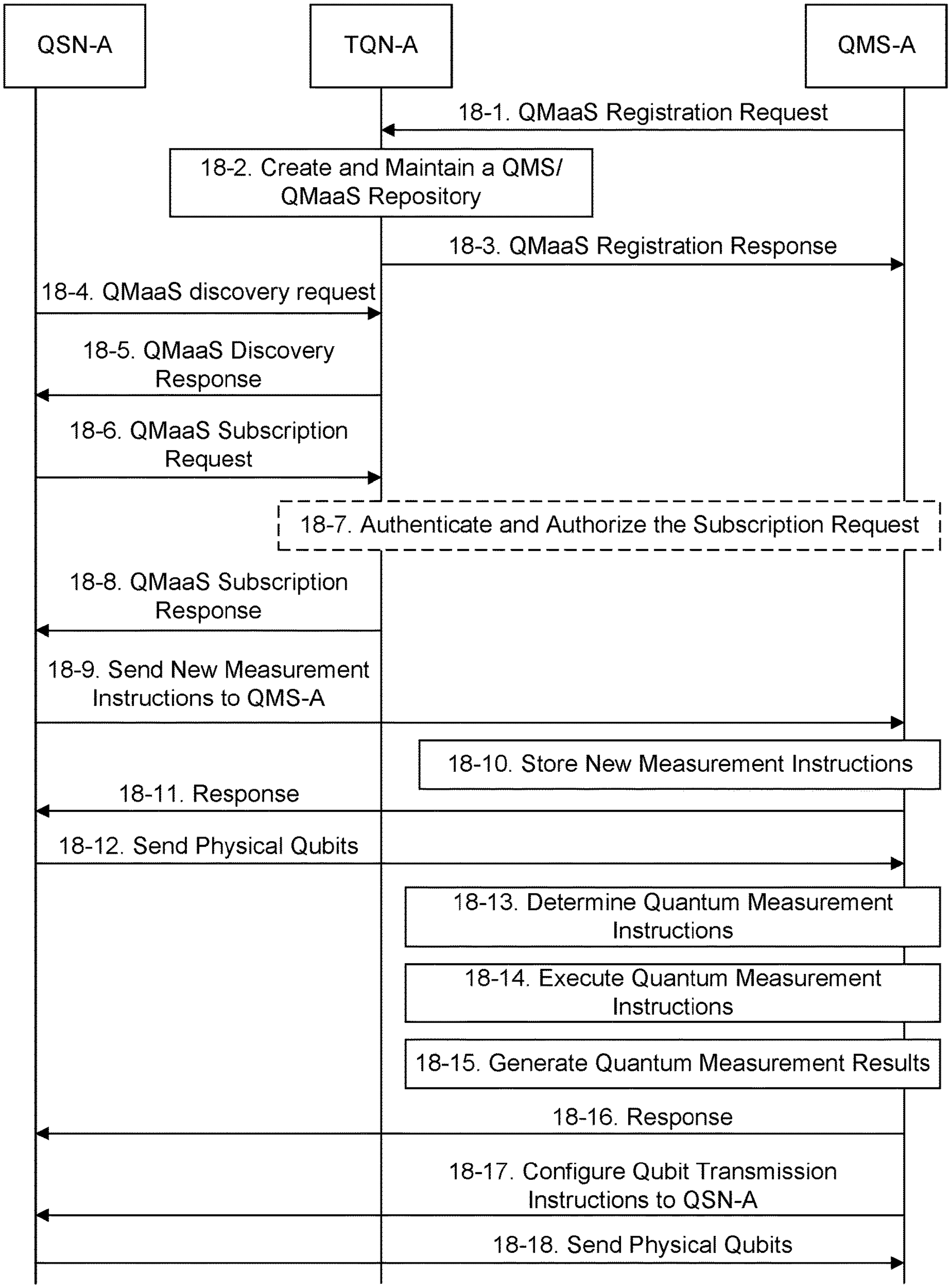
FIG. 18 is a diagram illustrating a representative procedure for a Source-Triggered QMaaS through Trusted Quantum Node according to an embodiment.
Figure 19:
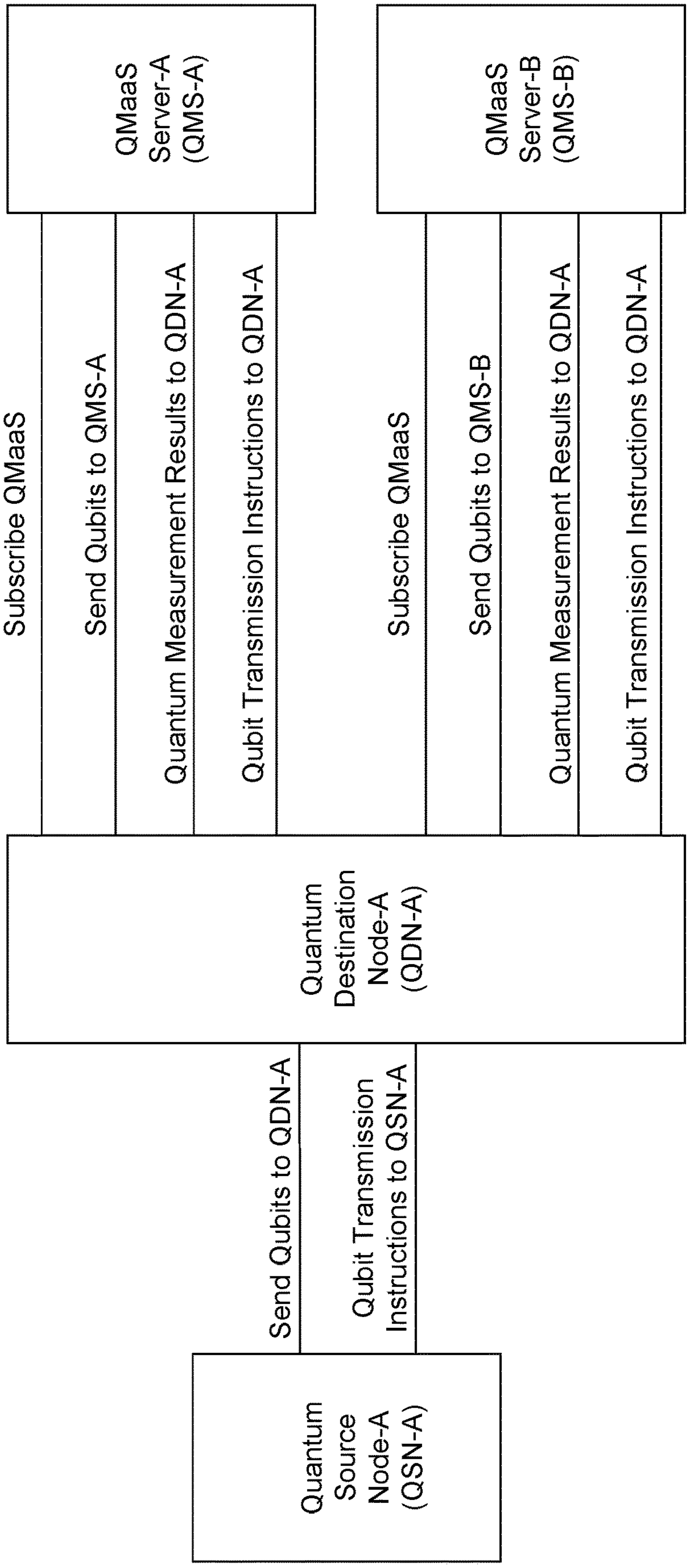
FIG. 19 illustrates an example of a Destination-Triggered QMaaS architecture according to an embodiment.

FIG. 17 illustrates another QMaaS method, referred to as source-triggered QMaaS through trusted quantum node. According to embodiments, a QSN-A may not communicate with a QMS-A directly, but for example, via an intermediary or proxying node TQN-A that sits between the QSN-A and the QMS-A. The QSN-A may (e.g., first) discover the QMS-A and its QMaaS via the TQN-A; in such a case, the QSN-A may subscribe to the discovered QMaaS likely assisted, relayed, and/or coordinated by the TQN-A; during QMaaS subscription, the QSN-A or the TQN-A may inform the QMS-A of some quantum measurement instructions to be used for measuring qubits from the QSN-A (or the TQN-A); if the subscription to QMaaS is successful, the QSN-A may (e.g., start to) transmit physical qubits directly to the QMS-A (or indirectly via the TQN-A if the TQN-A is capable of relaying qubits from the QSN-A to the QMS-A without impairing their quantum state); the QMS-A may receive physical qubits and store/or measure them according to the subscribed QMaaS and designated quantum measurement instructions from the QSN-A (or the TQN-A); finally, the QMS-A may generate quantum measurement results and send them to the TQN-A (and/or the QSN-A). Optionally, the QMS-A may send some new qubit transmission instructions to the QSN-A via the TQN-A, for example, to regulate how physical qubits should be transmitted to the QMS-A for measurement. An example of detailed procedures for source-triggered QMaaS through a trusted quantum node is illustrated in FIG. 18.

Step 18-1: A QMS-A may send a QMaaS registration request to a TQN-A to announce its offered QMaaS. This request may contain any of the following parameters. It is assumed that the QMS-A has been configured and/or provisioned with the address or identifier of the TQN-A.

- QMS-ID: The identifier of the QMS-A, which may be any of an IP address, a fully qualified domain name, etc.
- QMaaS-ID: The identifier of QMaaS that the QMS-A may host and/or may announce to the TQN-A. This parameter may indicate multiple QMaaS services provided by the QMS-A.
- QMaaS Features: The service features of QMaaS provided by the QMS-A. This parameter may include any of the following features: 1) the quantum memory size; 2) the supported quantum memory coherence time; 3) the supported quantum measurement protocols; 4) the supported quantum measurement performance (e.g., measurement speed, measurement error rate); 5) whether the quantum measurement results may be stored in the QMS-A; and/or 6) the supported maximum incoming rate of physical qubits that QMS-A can receive.

Step 18-2: The TQN-A may receive the QMaaS registration request and/or may store the contained information, for example to QMS/QMaaS repository, which may be used to serve QMaaS discovery request in step 18-4.

Step 18-3: The TQN-A may send a QMaaS registration response to the QMS-A indicating if the registration request in step 18-1 has been successful.

Step 18-4: The QSN-A may send a QMaaS discovery request to the TQN-A. This request may contain one or multiple following parameters:

- Expected QMaaS Features: The expected QMaaS features that a QMS-A may support. QMSs that may not support these expected QMaaS features may be discovered for the QSN-A.

Step 18-5: The TQN-A may receive the discovery request and may use the contained information (e.g., Expected QMaaS Features) to look up the QMS/QMaaS repository (maintained locally or remotely at a different location such as the same QMS-A or other QMSs) to find any qualified QMaaSs and corresponding QMSs. The TQN-A may create a QMaaS discovery response containing any or selected discovered QMS/QMaaS and/or may send the discovery response to the QSN-A.

Step 18-6: The QSN-A may receive the discovery response from the TQN-A and it may send a QMaaS subscription request to the TQN-A. This step may be similar to the previous embodiment described in step 16-1 in FIG. 16.

Step 18-7: TQN-A may receive the QMaaS subscription request. Similar to step 16-2 in FIG. 16, the TQN-A may authenticate and/or may authorize the subscription request. For this purpose, the TQN-A may authenticate and/or may authorize the subscription request on behalf of the QMS-A; in such a case, it may send a notification to the QMS-A to inform it of the authenticated subscription request from the QSN-A; this notification may contain any of the parameters as received from step 18-6. According to embodiments, the TQN-A may simply forward the QMaaS subscription request to the QMS-A; the QMS-A may authenticate and/or may authorize the subscription request as it may do for the previous embodiment described in step 16-2 in FIG. 16; in such a case the QMS-A may forward the authentication/authorization result to the TQN-A. In either way, the TQN-A may store the authentication/authorization result locally.

Step 18-8: The TQN-A may send a QMaaS subscription response to the QSN-A. This step may be similar to the previous embodiment described in step 16-3 in FIG. 16.

Step 18-9: The QSN-A may send new measurement instructions to the QSM-A, similar to the previous embodiment described in step 16-4 in FIG. 16. The QSN-A may first send new measurement instructions to the TQN-A, which may forward the new measurement instructions to the QMS-A.

Step 18-10: The QMS-A may receive new measurement instructions from the TQN-A (or the QSN-A), similar to the previous embodiment described in step 16-5 in FIG. 16.

Step 18-11: The QMS-A may send a response to the QSN-A, similar to step 16-6 in FIG. 16. The QMS-A may first send the response to the TQN-A, which may forward the response to the QSN-A.

Step 18-12: The QSN-A may send physical qubits directly to the QMS-A. If the TQN-A is able to relay qubits, the QSN-A may first send qubits to the TQN-A, which in such a case may relay these qubits to the QMS-A.

Step 18-13: This step may be the same as the previous embodiment described in step 16-8 in FIG. 16.

Step 18-14: This step may be the same as the previous embodiment described in step 16-9 in FIG. 16.

Step 18-15: This step may be the same as the previous embodiment described in step 16-10 in FIG. 16.

Step 18-16: The QMS-A may send a response to the QSN-A, similar to the previous embodiment described in step 16-11 in FIG. 16. The QMS-A may first send the response to the TQN-A, which may forward the response to the QSN-A. The TQN-A may store quantum measurement results contained in this response locally; in such a case, the QSN-A can simply retrieve the quantum measurement results from the TQN-A at a later time.

The response can be securely transmitted from the QMS-A to the TQN-A. For example, the QMS-A may establish a secure session with the TQN-A for receiving the response; in such a case, the QMS-A may send the response via the established secure session to the TQN-A. According to embodiments, the QMS-A may simply encrypt the response with a shared key and/or may send the encrypted response to the TQN-A; the TQN-A may receive the encrypted response and/or may decrypt it using the same shared key. Also, the QMS-A may use quantum secure direct communications to send the response to the TQN-A. In addition, the QMS-A may use superdense coding to send the response to the TQN-A although this approach may (e.g., need to) consume shared entanglement between the QMS-A and the TQN-A. The content of the response may include any of: a quantum measurement result, an identifier of the qubits being measured, the time when the quantum measurement has been conducted, an identifier of quantum measurement instruction or setting being used, a flag indicating if the response may be kept at the QMS-A, a new sending rate of qubits that the QMS-A expects to receive and can measure.

Step 18-17: This step may be similar to the previous embodiment described in step 16-12 in FIG. 16. The difference may be that the QMS-A may first send qubit transmission instructions to the TQN-A, which in such a case may forward these instructions to the QSN-A. Also, the TQN-A itself may (e.g., decide to) generate some new qubit transmission instructions after consulting with the QMS-A; in such a case, the TQN-A may send these new qubit transmission instructions to the QSN-A.

Step 18-18: This step may be the same as the previous step 18-13.

Destination-Triggered QMaaS

The destination-triggered QMaaS is illustrated in, where a Quantum Source Node-A (QSN-A) may have regular quantum communications (e.g., quantum key distribution and/or direct secure quantum communication) with a Quantum Destination Node-A (QDN-A). In other words, the QSN-A may send physical qubits to the QDN-A, while the QDN-A may leverage QMaaS provided by a QMaaS Server-A (QMS-A) and/or a QMS-B. This scenario may (e.g., need) use any of a set of operations among the QSN-A, QDN-A, QMS-A and QMS-B: 1) the QDN-A may subscribe QMaaS from the QMS-A and/or the QMS-B; 2) the QSN-A may send physical qubits to the QDN-A; 3) the QDN-A may receive qubits from the QSN-A; 4) the QDN-A may perform certain preliminary operations or transformations on the received qubits (e.g., buffer them, qubit state distillation, unitary qubit operations, etc.); 5) the QDN-A may send transformed qubits to the QMS-A and/or the QMS-B; 6) the QMS-A and/or the QMS-B may receive the transformed qubits from the QDN-A; 7) the QMS-A and/or the QMS-B may store and/or may measure the transformed qubits according to the subscribed QMaaS by the QDN-A; 8) the QMS-A and/or the QMS-B may send quantum measurement results to the QDN-A; 9) the QMS-A and/or the QMS-B may also send some qubits transmission instructions to the QDN-A; 10) the QDN-A may receive qubit transmission instructions from the QMS-A and/or the QMS-B and may determine some qubit transmission instructions for the QSN-A; 11) the QDN-A may send the determined qubit transmission instructions to the QSN-A.

Figure 20:
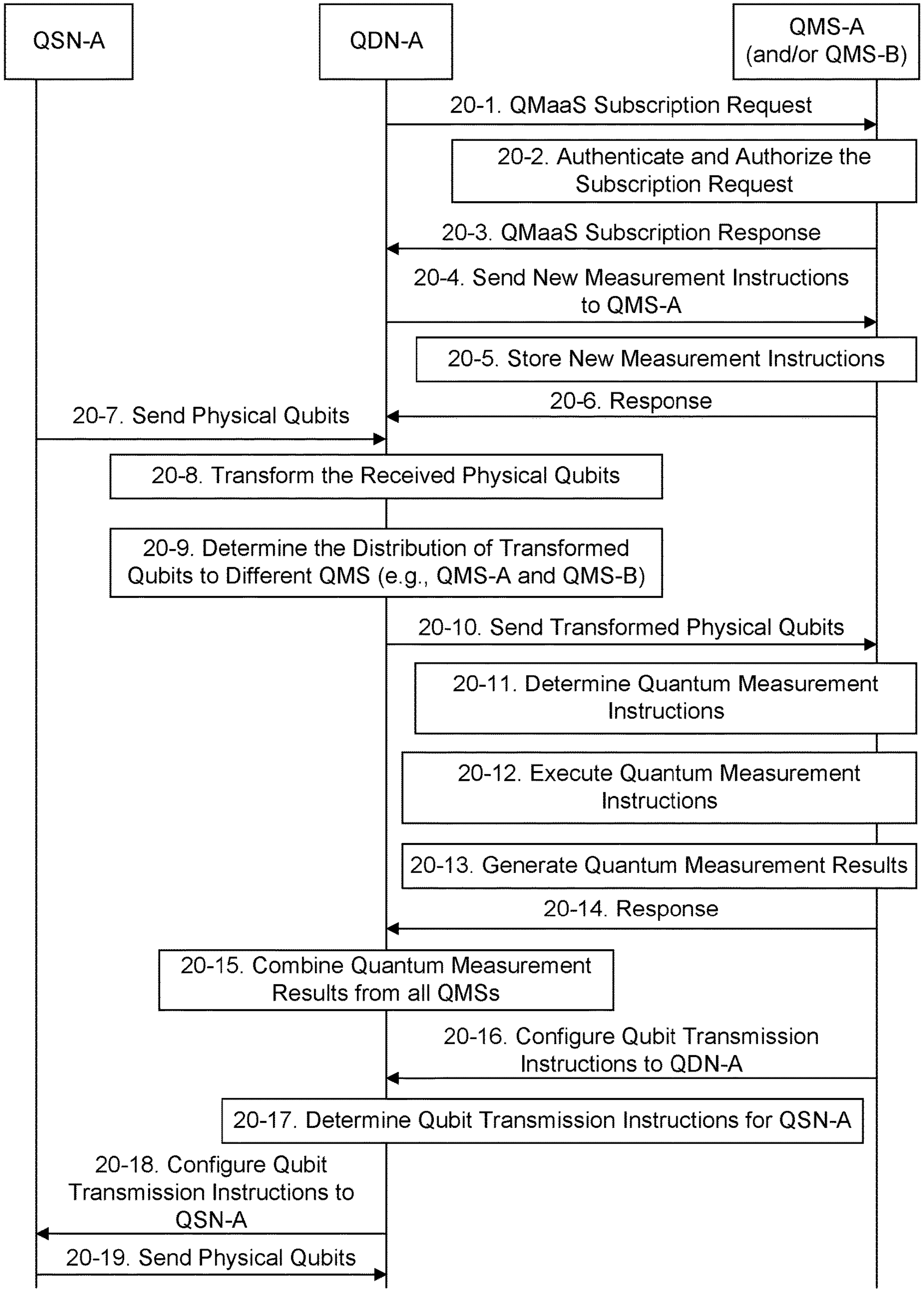
FIG. 20 is a diagram illustrating a representative procedure for a Destination-Triggered QMaaS according to an embodiment.

An example of detailed procedures for destination-triggered QMaaS is illustrated in FIG. 20.

Step 20-1: This step may be the same as the previous embodiment described in step 16-1 of FIG. 16. Additionally, the QDN-A may indicate that it is a quantum destination node; the QDN-A may also include the identifier and/or address of the QSN-A in this subscription request.

Step 20-2: This step may be the same as the previous embodiment described in step 16-2 of FIG. 16.

Step 20-3: This step may be the same as the previous embodiment described in step 16-3 of FIG. 16. After receiving this response message from the QMS-A and/or the QMS-B, the QDN-A may inform the QSN-A that physical qubits to be received from the QSN-A in step 20-7 may be relayed to the QMS-A and/or the QMS-B. The information about the subscribed QMaaS may be sent from the QDN-A to the QSN-A.

Step 20-4: This step may be the same as the previous embodiment described in step 16-4 of FIG. 16.

Step 20-5: This step may be the same as the previous embodiment described in step 16-5 of FIG. 16.

Step 20-6: This step may be the same as the previous embodiment described in step 16-6 of FIG. 16.

Step 20-7: This step may be the same as the previous embodiment described in step 16-7 of FIG. 16. The QSN-A may send physical qubits to the QDN-A.

Step 20-8: The QDN-A may receive physical qubits from the QSN-A. The QDN-A may perform some preliminary operations on the received physical qubits to transform the original physical qubits to new qubits, also referred to as transformed qubits. Later, the QMS-A and/or the QMS-B may only store and/or measure the transformed qubits via steps 20-11 to 20-13, as a result, the security and privacy of original physical qubits from QSN-A may be protected. It should be noted that the QDN-A may receive physical qubits from other QSNs as well; as a result, the QDN-A may send a set of mixed physical qubits (e.g., from the QSN-A and other QSNs) to the QMS-A or the QMS-B. The transformed qubits may be the same as original physical qubits.

Step 20-9: If the QDN-A has subscribed QMaaS from multiple QMSs via step 20-1, the QDN-A may (e.g., need to) determine which QMaaS/QMS that each transformed qubit may (e.g., need to) be forwarded to. For example, the QDN-A may forward transformed qubits to multiple QMSs in any of a round-robin manner, in a random manner, etc. In another example, the QDN-A may distribute all transformed qubits to multiple QMSs evenly or in a certain ratio. As a result, even if the transformed qubits may be the same as original physical qubits, a single QMS may not easily figure out/determine the sequence and meaning of original physical qubits.

Step 20-10: The QDN-A may send transformed qubits to the corresponding QMS (e.g., the QMS-A and/or the QMS-B) according to the decision of step 20-9.

Step 20-11: This step may be the same as the previous embodiment described in step 16-8 of FIG. 16.

Step 20-12: This step may be the same as the previous embodiment described in step 16-9 of FIG. 16.

Step 20-13: This step may be the same as the previous embodiment described in step 16-10 of FIG. 16.

Step 20-14: This step may be the same as the previous embodiment described in step 16-11 of FIG. 16.

Step 20-15: The QDN-A may combine quantum measurement results from each single QMS (e.g., QMS-A and/or QMS-B). For this purpose, the QDN-A may first (e.g., need to) retrieve quantum measurement results from each single QMS, if the received response from step 20-14 does not contain any quantum measurement results but their address at the QMS. In such a case, the QDN-A aggregates all quantum measurement results from each QMS to generate final quantum measurement results for the received original physical qubits from step 20-7. Since the quantum measurement result from each QMS may be about transformed qubits that may be distributed to each QMS via step 20-10, how the transformed qubits may have been generated in step 20-8 and/or how transformed qubits may have been split in step 20-9 may be used as the reverse process to generate final quantum measurement results for original physical qubits.

Step 20-16: This step may be the same as the previous embodiment described in step 16-12 of FIG. 16.

Step 20-17: The QDN-A may (e.g., decide to) some qubit transmission instructions (e.g., instruct the QSN-A to increase and decrease the qubit transmission speed), optionally, for example, based on the quality of final measurement results generated in step 20-15 and/or qubit transmission instructions from step 20-16.

Step 20-18: The QDN-A may send qubit transmission instructions, for example, as determined in step 20-17 to the QSN-A.

Step 20-19: Similar to step 20-7, the QSN-A may continue to send physical qubits to the QDN-A, but according to new qubit transmission instructions as received from step 20-18. Steps 20-8 to 20-18 may be repeated after step 20-19.

O-RAN Embodiment

A QMaaS functional architecture and QMaaS procedures may be leveraged for enabling a more secure O-RAN. Specifically, since O-RAN nodes may be expected to be sourced from different suppliers, it may be (e.g., very important) useful that they may be securely connected to each other in an easy-to-deploy manner. QIT techniques like QKD may be used to perform this secure connection between O-RAN nodes. However, having full qubit storage and measurement ability in each O-RAN node may be expensive. For example, if the qubit memory and measurement (e.g., require) use cryogenic equipment, in such a case it may be easier to have this functionality in QMaaS located in the Core Network. The CN may be either an evolved 5G or 6G CN as described previously.

Figure 21:
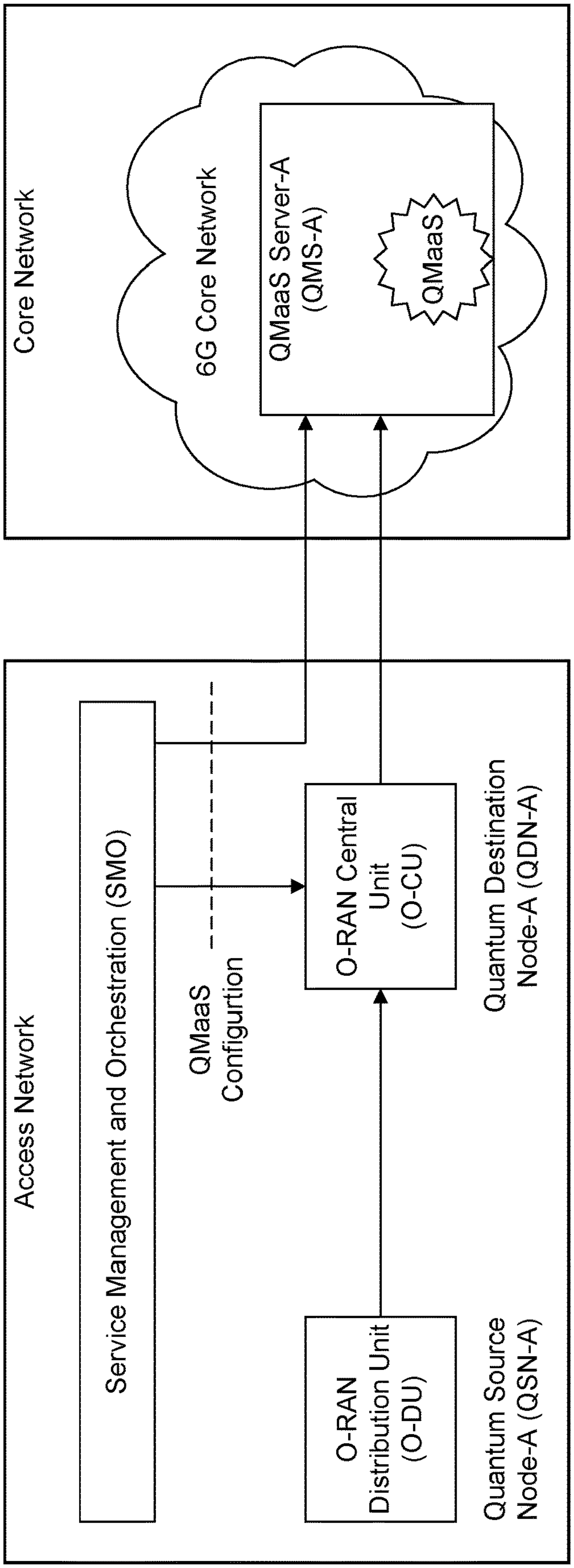
FIG. 21 is a system diagram illustrating a QMaaS integration with O-RAN according to an embodiment.

An example of QMaaS deployment for O-RAN is illustrated in FIG. 21, which may be based on existing O-RAN architecture. This deployment may provide the following functionalities and features:

- A QMS-A with QMaaS may be placed in future core network such as 6G core network.
- A O-DU may act as a QSN-A, while a O-CU may act as a QDN-A. They may leverage destination-triggered QMaaS features described above to leverage QMaaS provided by the QMS-A.
- Before leveraging QMaaS, a Service Management and Orchestration (SMO) may first discover the QMS-A, for example, from a Network Repository Function (NRF) in a core network, assuming the QMS-A may have registered itself and/or its QMaaS to the NRF. Then, the SMO may configure some necessary QMaaS-related information to the QDN-A (i.e., O-CU) and/or the QMS-A. For example, the SMO may configure the address of the QMS-A to the QDN-A; the SMO may also configure some qubit transmission instructions to the QDN-A on behalf of the QMS-A. In another example, the SMO may configure some quantum measurement instructions to the QMS-A on behalf of the O-CU. The SMO may subscribe QMaaS from the QMS-A on behalf of the O-CU; according to embodiments, the O-CU may subscribe to QMaaS by itself.
- The O-DU and O-CU may have regular quantum communications such as quantum key distribution. For example, the O-DU may send physical qubits in photons to the O-CU; the O-CU may receive physical qubits from the O-DU, optionally may transform them to transformed qubits and may/or relay transformed qubits to the QMS-A; the QMS-A may receive transformed qubits and may store and/or may measure them. Finally, the QMS-A may send quantum measurement results to the O-CU or the O-CU may actively retrieve the quantum measurement results from QMS-A.

3GPP Embodiment

The described QMaaS functional architecture and QMaaS procedures may be integrated into an evolved 5G or 6G Service-Based Architecture (SBA). The SBA interfaces may be relayed over classical HTTP messages sent over TCP/IP all using classical bits. Addition of QMaaS may mean that the SBA interfaces may be expanded to support qubit transmission in addition to the current classical bits. The QMaaS functionality addition into the SBA may also allow it to easily support the O-RAN embodiment shown in FIG. 21.

Figure 22:
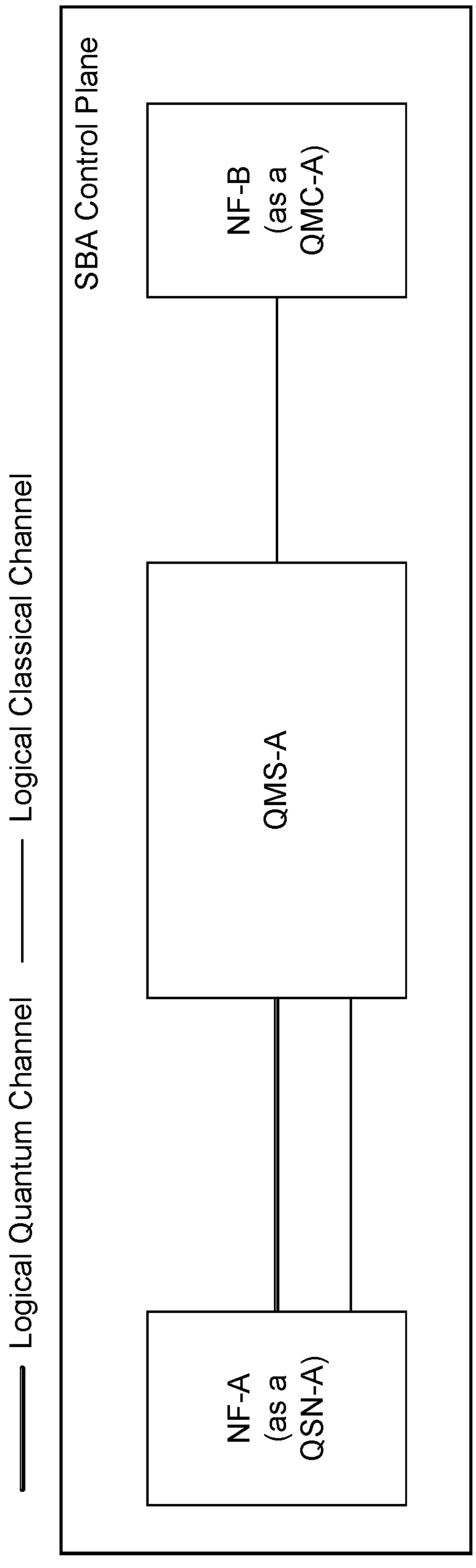
FIGS. 22 and 23 are system diagrams illustrating a QMaaS integration with 5G/6G Service-Based Architecture (SBA) according to embodiments.

An example of QMaaS deployment in 5G/6G SBA is illustrated in FIG. 22. This deployment may provide any of the following functionalities and features:

- Network Function-A (NF-A) may act as a QSN-A, which may have both a logic quantum channel and a logical classical channel to a QMS-A.
- NF-A as a QSN may leverage all source-triggered QMaaS features described above to leverage QMaaS from the QMS-A.
- Network Function-B (NF-B) may act as a QMC-A, which may (e.g., only) have a classical logical channel to the QMS-A.
- NF-B as a QMC may leverage all client-triggered QMaaS features described above to leverage QMaaS provided by the QMS-A.

Figure 23:
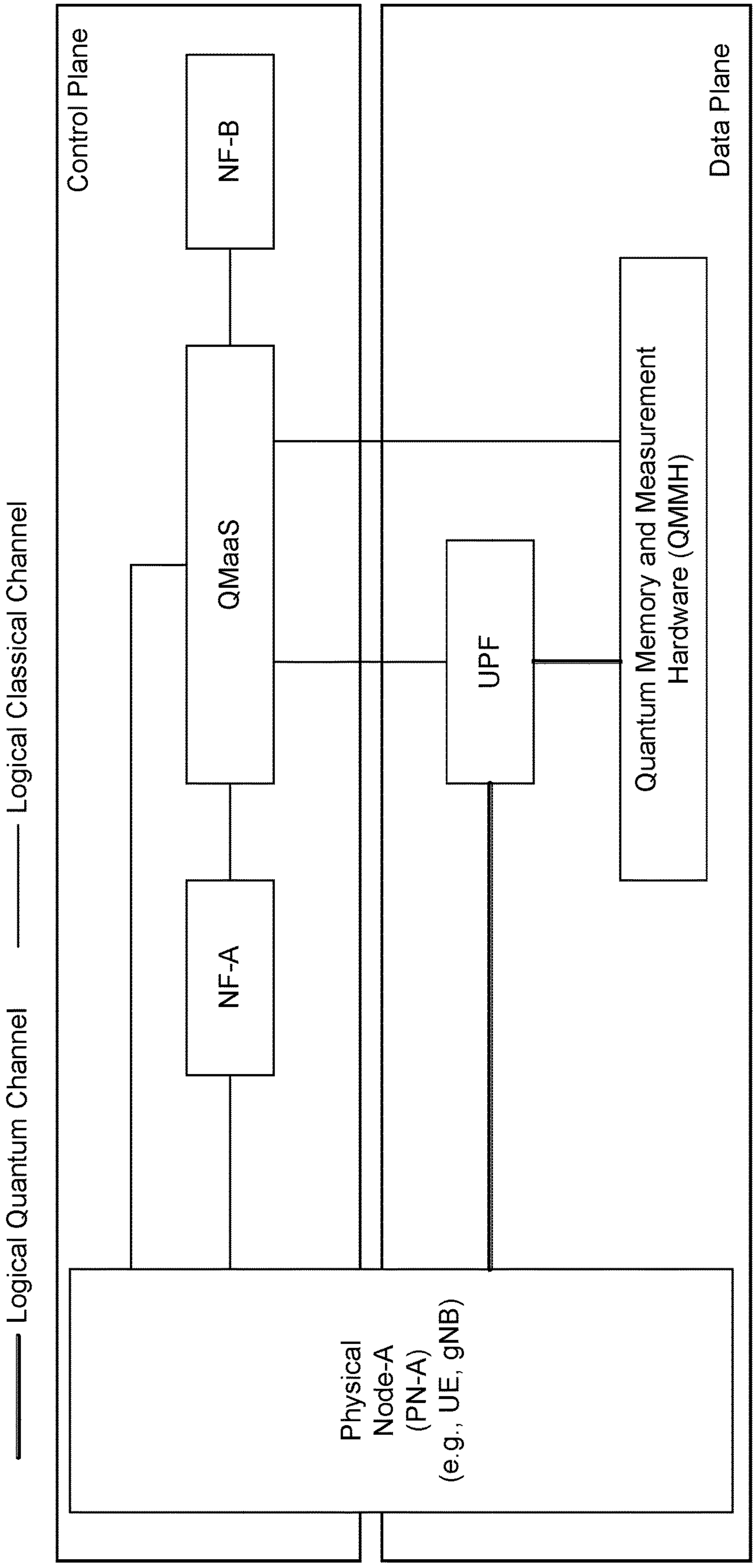

FIG. 23 illustrates another embodiment for deployment of the described QMaaS in the context of 5G/6G SBA. This example deployment may provide any of the following functionalities and features.

QMaaS may be implemented as a control plane network function, while Quantum Memory and Measurement Hardware (QMMH) may be deployed in the data plane. QMaaS may access QMMH directly or indirectly via a UPF.

A Physical Node-A (PN-A) may be a UE, a base station, etc. The PN-A may have a logical quantum channel to a UPF on data plane, and logical classical channels to control plane.

The PN-A may leverage QMaaS to measure some qubits. On control plane, the PN-A may interface to QMaaS directly or indirectly via a NF-A (e.g., AMF, NEF); on data plane, the PN-A may send qubits to the UPF to be measured by QMMH. Quantum measurement results may be stored and managed by QMaaS; QMaaS may be responsible for sending the quantum measurement results to the PN-A via control plane (or event data plane) or waiting for the PN-A to retrieve them.

The PN-A may be a QSN; as a result, the PN-A may use the source-triggered QMaaS features described above to leverage QMaaS.

The PN-A may also be a QDN; as a result, the PN-A may use the destination-triggered QMaaS features described above to leverage QMaaS.

Figure 24:
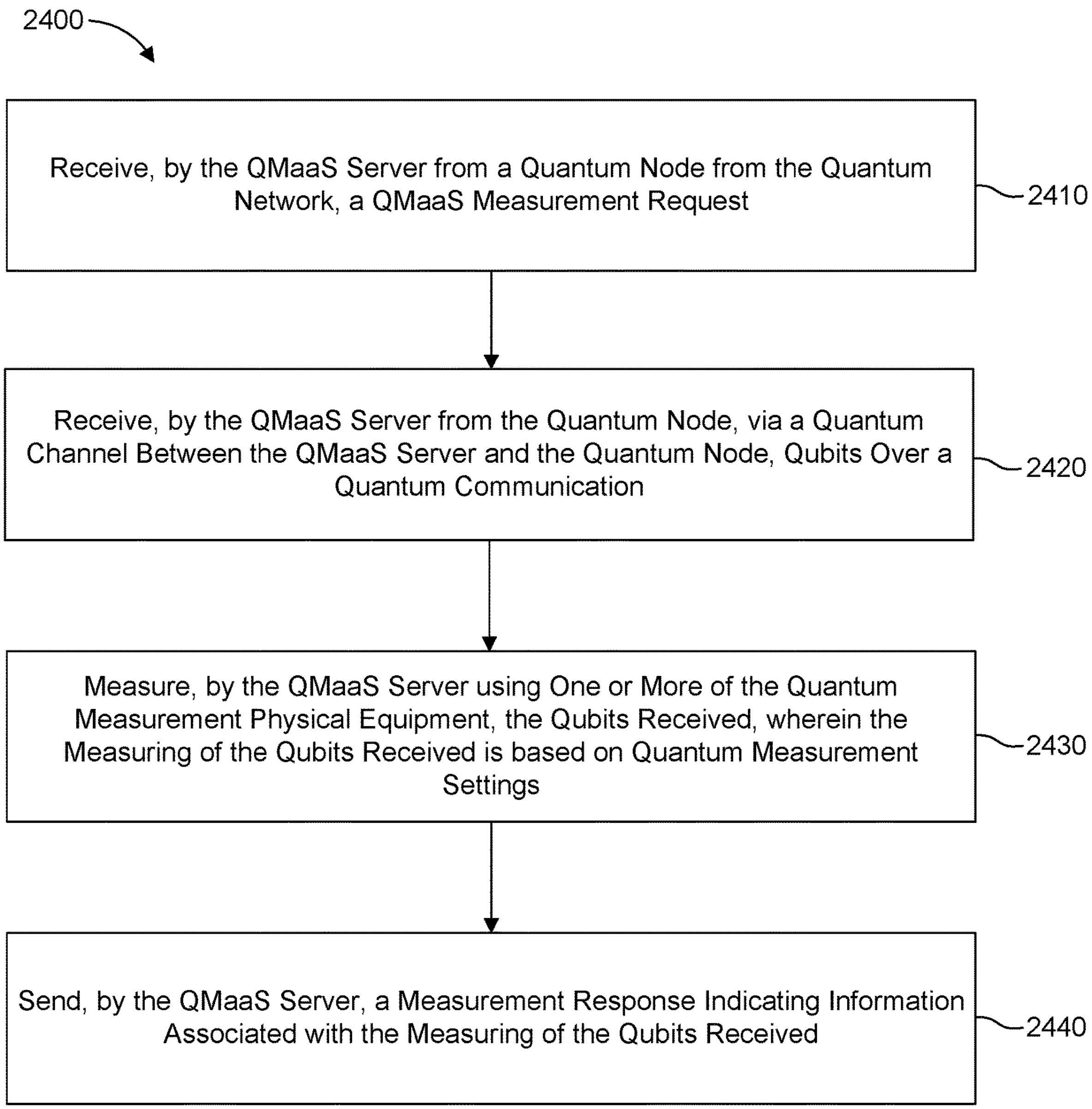
FIG. 24 is a diagram illustrating an example of quantum measurement implemented by a device comprising a QMaaS server.

FIG. 24 is a diagram illustrating an example of a method 2400 of quantum measurement implemented by a device comprising a QMaaS server, the QMaaS server may comprise one or more quantum measurement physical equipment, the QMaaS server may use one or more quantum communications with one or more quantum nodes of a quantum network.

According to embodiments, in a step 2410, the QMaaS server may be configured to receive, from a quantum node from the quantum network, a QMaaS measurement request.

According to embodiments, in a step 2420, the QMaaS server may be configured to receive, from the quantum node, via a quantum channel between the QMaaS server and the quantum node, qubits over a quantum communication.

According to embodiments, in a step 2430, the QMaaS server may be configured to measure, for example, using one or more of the quantum measurement physical equipment, the qubits received, the measuring of the qubits received may be based on quantum measurement settings.

According to embodiments, in a step 2440, the QMaaS server may be configured to send a measurement response indicating information associated with the measuring of the qubits received.

For example, the QMaaS server may be configured to store the physical qubits received, by the QMaaS server, in a quantum memory. The quantum memory may be included in any of the QMaaS server and/or in another QMaaS server.

For example, the QMaaS server may be configured to send a message indicating information on the storage of the qubits received.

For example, the QMaaS server may be configured to authenticate and/or authorize, the quantum measurement request, for example, based on parameters comprised in the quantum measurement request.

For example, the QMaaS server may be configured to store the quantum measurement results in a quantum memory. The quantum memory may be included in any of the QMaaS server and/or in another QMaaS server.

For example, the QMaaS server may be configured to generate, by the QMaaS a quantum measurement result. The measurement response may indicate information associated with the quantum measurement result.

For example, the measurement response sent by the QMaaS server may comprise the quantum measurement result.

For example, the response sent by the QMaaS server may comprise an address of the quantum memory wherein the quantum measurement result may be stored.

For example, the QMaaS server may be configured to send to the quantum node, a trigger request to trigger the quantum node to send physical qubits to the QMaaS server.

For example, the measurement response may be securely sent.

For example, the QMaaS server may be configured to send, by the QMaaS server, a message indicating information on instructions to regulate a transmission of the qubits to the QMaaS server.

For example, the QMaaS server may be configured to receive a subscription request to the QMaaS server; and/or to send, a subscription response indicating authentication and/or authorization of the subscription request, for example based on parameters comprised in the subscription request.

For example, the qubits received may comprise physical qubits.

For example, the quantum measurement settings may comprise any of: measurement basis, requested measurement protocols, a maximum delay for the quantum measurement from the reception of a qubit by the QMaaS server, a condition on quantum joint measurement over multiple qubits.

Figure 25:
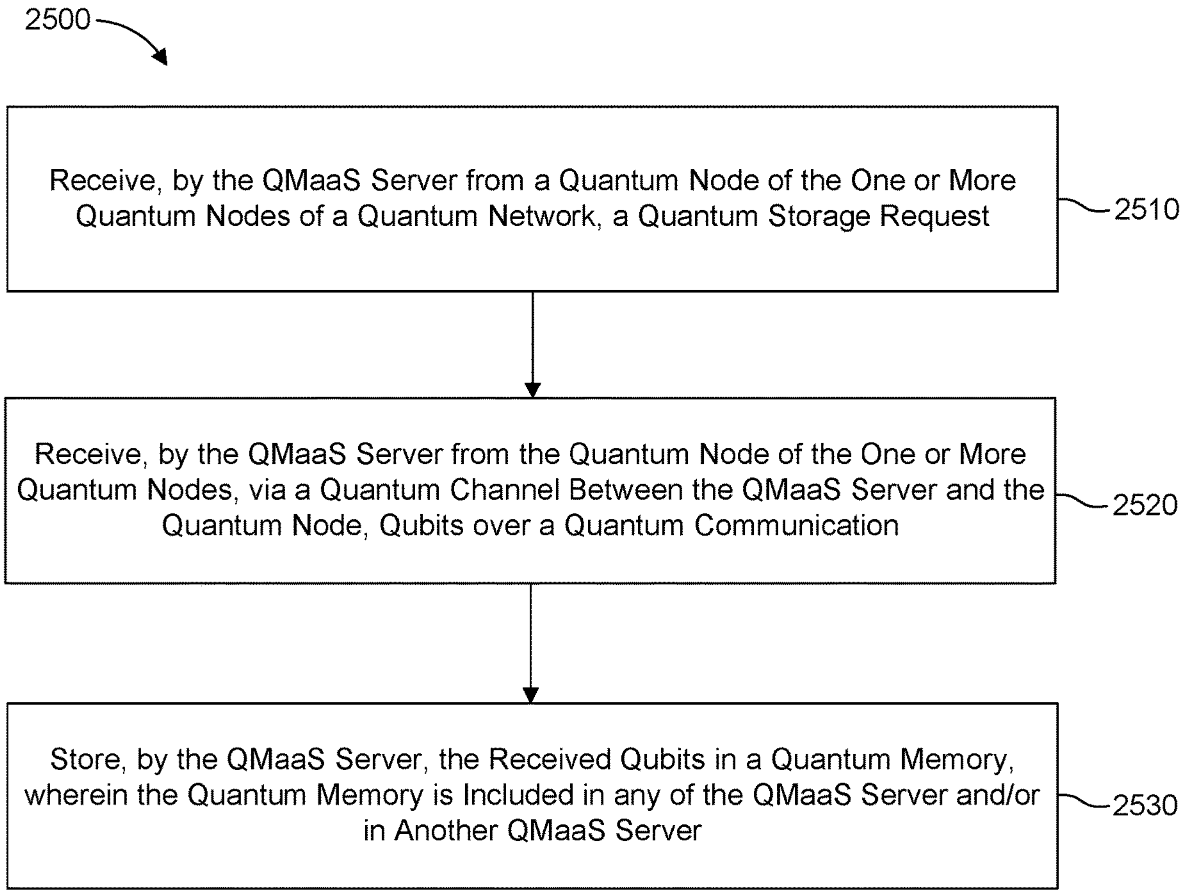
FIG. 25 is a diagram illustrating an example of a method of quantum storage implemented by a device comprising a QMaaS server.

FIG. 25 is a diagram illustrating an example of a method 2500 of quantum storage implemented by a device comprising a QMaaS server, the QMaaS server may use one or more quantum communications with one or more quantum nodes of a quantum network.

According to embodiments, in a step 2510, the QMaaS server may be configured to receive from a quantum node of the one or more quantum nodes of a quantum network, a quantum storage request.

According to embodiments, in a step 2520, the QMaaS server may be configured to receive from the quantum node of the one or more quantum nodes, via a quantum channel between the QMaaS server and the quantum node, qubits over a quantum communication.

According to embodiments, in a step 2530, the QMaaS server may be configured to store the received qubits in a quantum memory. The quantum memory may be included in any of the QMaaS server and/or in another QMaaS server.

For example, the QMaaS server may be configured to send a message indicating information on the storage of the physical qubits received.

For example, the QMaaS server may be configured to authenticate and/or authorize, by the QMaaS server, the quantum storage request, for example, based on parameters comprised in the quantum storage request.

Figure 26:
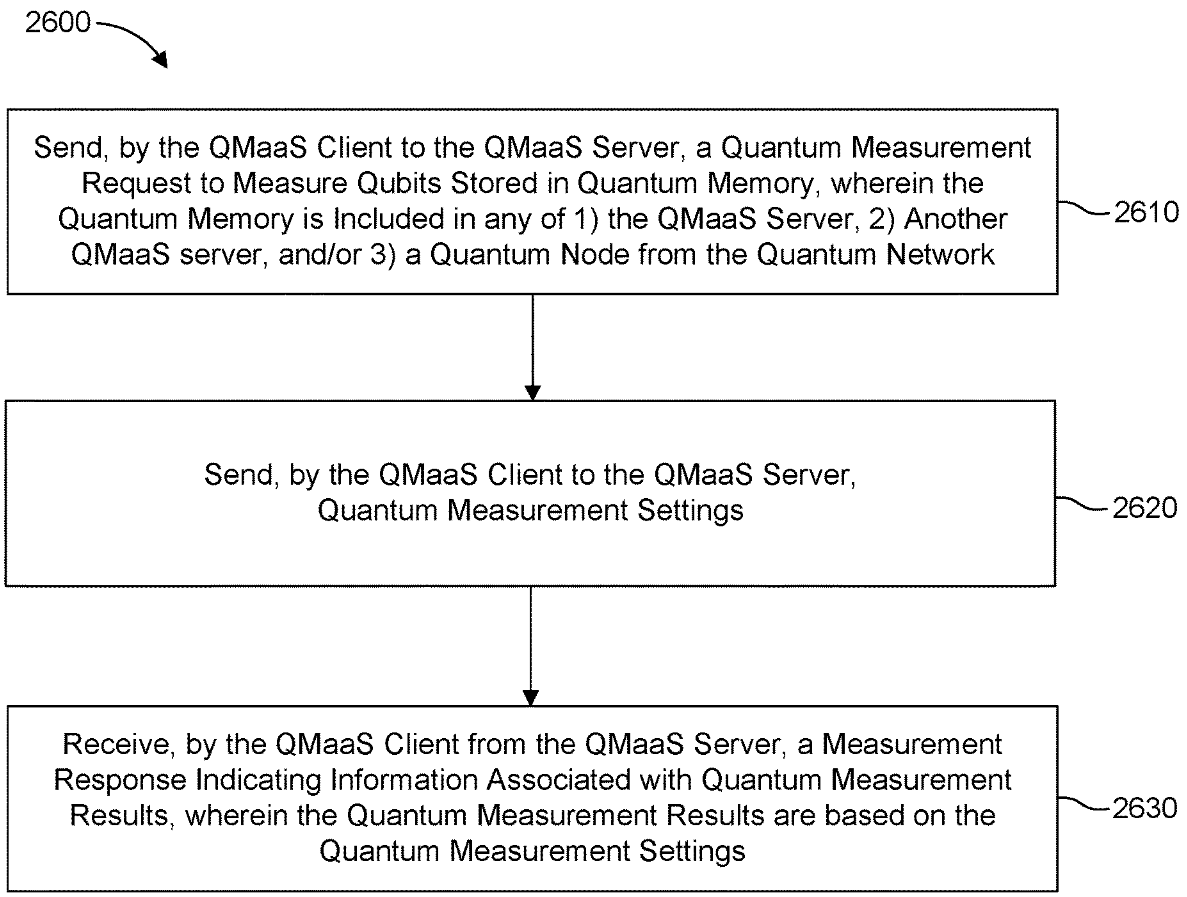
FIG. 26 is a diagram illustrating an example of a method of quantum measurement implemented by a device comprising a QMaaS client.

FIG. 26 is a diagram illustrating an example of a method 2600 of quantum measurement implemented by a device comprising a QMaaS client, the QMaaS client may communicate with a QMaaS server comprising one or more quantum measurement physical equipment, the QMaaS server may use one or more quantum communications with one or more quantum nodes of a quantum network.

According to embodiments, in a step 2610, the QMaaS client may be configured to send to the QMaaS server, a quantum measurement request to measure qubits stored in quantum memory. The quantum memory may be included in any of 1) the QMaaS server, 2) another QMaaS server, and/or 3) a quantum node from the quantum network.

According to embodiments, in a step 2620, the QMaaS client may be configured to send to the QMaaS server, quantum measurement settings.

According to embodiments, in a step 2630, the QMaaS client may be configured to receive from the QMaaS server, a measurement response indicating information associated with quantum measurement results. The quantum measurement results may be based on the quantum measurement settings.

For example, the QMaaS client may be configured to send to the QMaaS server, a subscription request to the QMaaS server; and/or to receive from the QMaaS server, a subscription response indicating authentication and/or authorization of the subscription request, for example, based on parameters comprised in the subscription request.

For example, the measurement response sent by the QMaaS server may comprise the quantum measurement results.

For example, the measurement response sent by the QMaaS server may comprise an address of the quantum memory wherein the quantum measurement results may be stored.

For example, the QMaaS client may be configured to send to the quantum node from the quantum network, a trigger request to trigger the quantum node to send qubits to the QMaaS server, over a quantum communication, via a quantum channel between the QMaaS server and the quantum node.

For example, the quantum measurement settings may comprise any of: measurement basis, requested measurement protocols, a maximum delay for the quantum measurement from the reception of a qubit by the QMaaS server, a condition on quantum joint measurement over multiple qubits.

Figure 27:
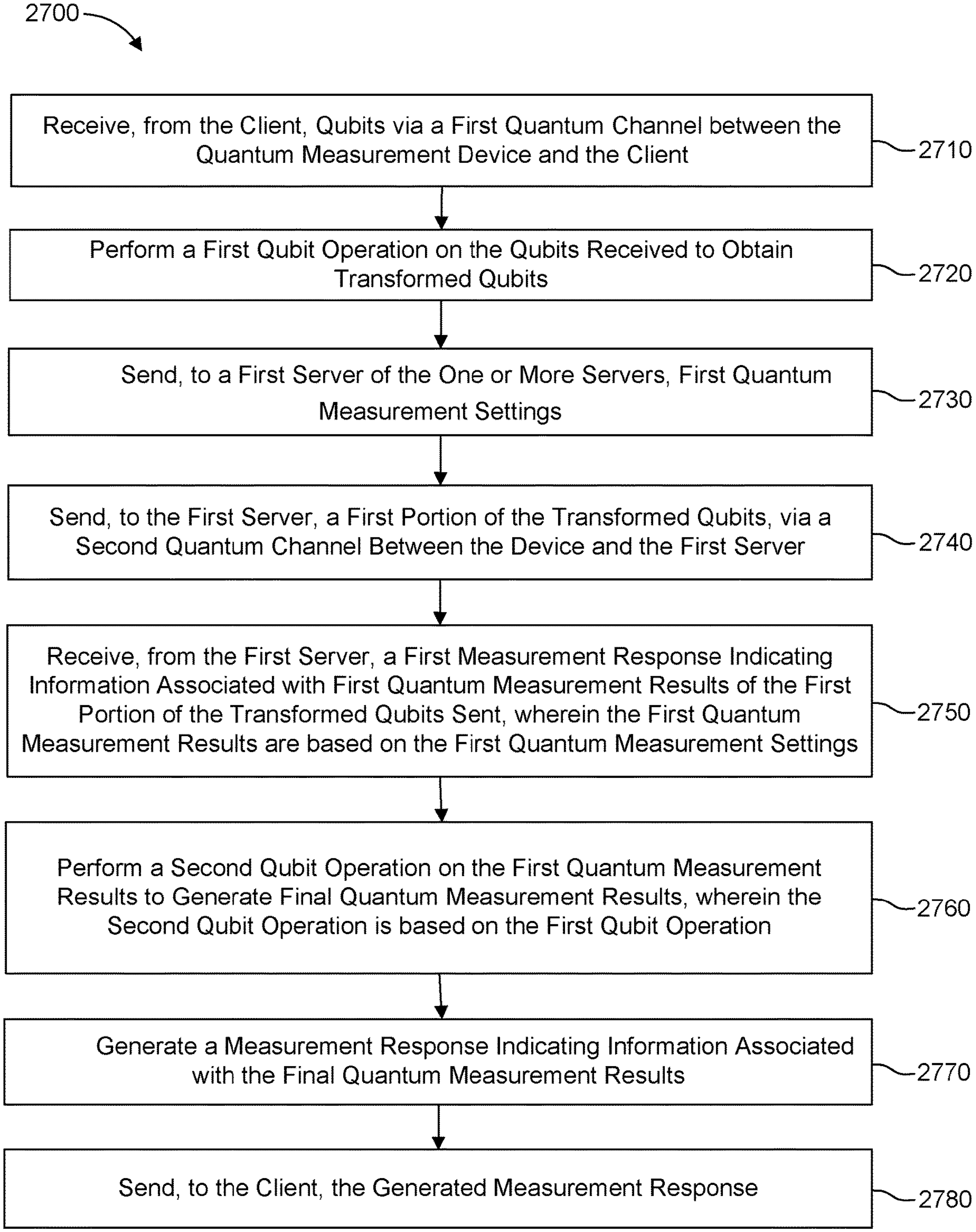
FIG. 27 is a diagram illustrating an example of a method of quantum measurement implemented by a quantum measurement device.

FIG. 27 is a diagram illustrating an example of a method 2700 of quantum measurement implemented by a quantum measurement device, the quantum measurement device communicating with a client and with one or more qmaas servers, wherein the one or more qmaas servers comprise one or more quantum measurement physical equipment.

According to embodiments, in a step 2710, the quantum measurement device may be configured to receive, from the client, qubits via a first quantum channel between the quantum measurement device and the client.

According to embodiments, in a step 2720, the quantum measurement device may be configured to perform a first qubit operation on the qubits received to obtain transformed qubits.

According to embodiments, in a step 2730, the quantum measurement device may be configured to send to a first server of the one or more servers, first quantum measurement settings.

According to embodiments, in a step 2740, the quantum measurement device may be configured to send, to the first server, a first portion of the transformed qubits, via a second quantum channel between the device and the first server.

According to embodiments, in a step 2750, the quantum measurement device may be configured to receive, from the first server, a first measurement response indicating information associated with first quantum measurement results of the first portion of the transformed qubits sent. The first quantum measurement results may be based on the first quantum measurement settings.

According to embodiments, in a step 2760, the quantum measurement device may be configured to perform a second qubit operation on the first quantum measurement results to generate final quantum measurement results the qubits received. The second qubit operation may be based on (e.g., a reverse operation of) the first qubit operation. How the transformed qubits may have been generated may be used as the reverse process to generate final quantum measurement results for original physical qubits.

According to embodiments, in a step 2770, the quantum measurement device may be configured to generate a measurement response indicating information associated with the final quantum measurement results.

According to embodiments, in a step 2780, the quantum measurement device may be configured to send, to the client, the generated measurement response.

For example, the quantum measurement device may be configured to send to a second server of the one or more servers, second quantum measurement settings. For example, the quantum measurement device may be configured to send, to the second server, a second portion of the transformed qubits. For example, the quantum measurement device may be configured to receive, from the second server, a second measurement response indicating information associated with second quantum measurement results of the second portion of the transformed qubits sent. The second quantum measurement results may be based on the second quantum measurement settings. For example, the quantum measurement device may be configured to combine the first quantum measurement results of the first portion of the transformed qubits sent and the second quantum measurement results of the second portion of the transformed qubits sent. For example, the quantum measurement device may be configured to perform the second qubit operation on the combined quantum measurement results to generate the final quantum measurement results.

For example, the quantum measurement device may be configured to send, to the client, a message indicating information on instructions to regulate a transmission rate of qubits to the device. For example, the quantum measurement device may be configured to receive, from the client, via the first quantum channel between the device and the client, qubits according to the transmission rate of qubits.

For example, the quantum measurement device may be configured to receive from the first qmaas server, a message indicating information on instructions to regulate a transmission rate of qubits to the first server; and/or to send, to the first server, via the second quantum channel between the device and the first server, the transformed qubits according to the transmission rate of qubits.

For example, the quantum measurement device may be configured to send, to the first server, a subscription request to the first server; and/or to receive, from the first server, a subscription response indicating authentication and/or authorization of the subscription request based on parameters comprised in the subscription request.

For example, the generated measurement response may comprise the quantum measurement results.

For example, the generated measurement response may comprise an address of the quantum memory wherein the quantum measurement results are stored.

For example, the quantum measurement settings may comprise any of: measurement basis, requested measurement protocols, a maximum delay for the quantum measurement from the reception of a qubit by the first server, a condition on quantum joint measurement over multiple qubits.

For example, the generated measurement response may be securely sent.

For example, the qubits may receive comprises physical qubits.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such.

Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-ID. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase “A or B” will be understood to include the possibilities of “A” or “B” or “A and B.” Further, the terms “any of” followed by a listing of a plurality of items and/or a plurality of categories of items, as used herein, are intended to include “any of,” “any combination of,” “any multiple of,” and/or “any combination of multiples of” the items and/or the categories of items, individually or in conjunction with other items and/or other categories of items. Moreover, as used herein, the term “set” is intended to include any number of items, including zero. Additionally, as used herein, the term “number” is intended to include any number, including zero. And the term “multiple”, as used herein, is intended to be synonymous with “a plurality”.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as “up to,” “at least,” “greater than,” “less than,” and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms “means for” in any claim is intended to invoke 35 U.S.C. § 112, ¶6 or means-plus-function claim format, and any claim without the terms “means for” is not so intended.

What is claimed is:

1. A method of quantum measurement implemented by a device, the device configured to communicate with a client and with one or more servers, wherein the one or more servers comprise one or more quantum measurement physical equipment, the method comprising:

receiving qubits from the client via a first quantum channel between the device and the client;

performing a first qubit operation on the qubits to obtain transformed qubits;

sending, to a first server of the one or more servers, one or more first quantum measurement settings;

sending a first portion of the transformed qubits to the first server via a second quantum channel between the device and the first server;

receiving, from the first server, information indicating one or more first quantum measurement results of the first portion of the transformed qubits, wherein the one or more first quantum measurement results are based on the first quantum measurement settings;

obtaining the one or more first quantum measurement results based on the information received, and performing a second qubit operation on the one or more first quantum measurement results to generate one or more final quantum measurement results of the qubits, wherein the second qubit operation is based on the first qubit operation; and sending, to the client, information indicating the one or more final quantum measurement results.

2. The method according to claim 1, comprising:

generating a measurement response comprising or indicating the information indicating the one or more final quantum measurement results, wherein sending, to the client, information indicating the one or more final quantum measurement results comprises sending, to the client, the measurement response comprising or indicating the information indicating the one or more final quantum measurement results.

3. The method according to claim 1, comprising:

sending, to a second server of the one or more servers, one or more second quantum measurement settings and a second portion of the transformed qubits;

receiving, from the second server, information indicating one or more second quantum measurement results of the second portion of the transformed qubits, wherein the one or more second quantum measurement results are based on the one or more second quantum measurement settings;

obtaining the one or more second quantum measurement results based on the information received and combining one or more of the one or more first quantum measurement results and one or more of the one or more second quantum measurement results; and performing the second qubit operation on the combined one or more of the one or more first quantum measurement results and one or more of the one or more second quantum measurement results to generate the one or more final quantum measurement results.

4. The method according to claim 3, comprising receiving information indicating an address of a quantum memory wherein the one or more second quantum measurement results are stored.

5. The method according to claim 1, wherein receiving, from the second server, the information indicating one or more second quantum measurement results comprises:

receiving, from the second server, a measurement response comprising or indicating the information indicating one or more second quantum measurement results.

6. The method according to claim 1, comprising:

sending, to the client, information indicating instructions to regulate a transmission rate of qubits to the device; and receiving, via the first quantum channel, qubits according to the transmission rate of qubits.

7. The method according to claim 1, comprising:

receiving, from the first server, information indicating instructions to regulate a transmission rate of qubits to the first server; and sending, via the second quantum channel, the transformed qubits according to the transmission rate of qubits.

8. The method according to at least one of claims 1 to 7, comprising:

sending, to the first server, a subscription request indicating, or comprising information indicating, one or more parameters; and receiving, from the first server, a subscription response indicating, or comprising information indicating, one or more of an authentication of and an authorization of the subscription request based on the one or more parameters.

9. The method according to claim 1, comprising receiving information indicating the one or more final quantum measurement results.

10. The method according to claim 1, comprising receiving information indicating an address of a quantum memory wherein the one or more first quantum measurement results are stored.

11. A device capable of communicating with a client and with one or more servers, wherein the one or more servers comprise one or more quantum measurement physical equipment, the device being configured to:

receive qubits from the client via a first quantum channel between the device and the client;

perform a first qubit operation on the qubits to obtain transformed qubits;

send, to a first server of the one or more servers, one or more first quantum measurement settings;

send a first portion of the transformed qubits to the first server via a second quantum channel between the device and the first server;

receive, from the first server, information indicating one or more first quantum measurement results of the first portion of the transformed qubits, wherein the one or more first quantum measurement results are based on the one or more first quantum measurement settings;

obtain the one or more first quantum measurement results based on the information received, and perform a second qubit operation on the one or more first quantum measurement results to generate one or more final quantum measurement results of the qubits, wherein the second qubit operation is based on the first qubit operation; and send, to the client, information indicating the one or more final quantum measurement results.

12. The device according to claim 11, configured to:

generate a measurement response comprising or indicating the information indicating the one or more final quantum measurement results, wherein being configured to send, to the client, information indicating the one or more final quantum measurement results comprises being configured to send, to the client, the measurement response comprising or indicating the information indicating the one or more final quantum measurement results.

13. The device according to claim 11, configured to:

send, to a second server of the one or more servers, one or more second quantum measurement settings and a second portion of the transformed qubits;

receive, from the second server, information indicating one or more second quantum measurement results of the second portion of the transformed qubits, wherein the one or more second quantum measurement results are based on the one or more second quantum measurement settings;

obtain the one or more second quantum measurement results based on the information received, and combine the one or more first quantum measurement results and the one or more second quantum measurement results; and perform the second qubit operation on the combined one or more of the one or more first quantum measurement results and one or more of the one or more second quantum measurement results to generate the one or more final quantum measurement results.

14. The device according to claim 13, configured to receive information indicating an address of a quantum memory wherein the one or more second quantum measurement results are stored.

15. The device according to claim 11, wherein being configured to receive, from the second server, the information indicating the one or more second quantum measurements results comprises being configured to:

receive, from the second server, a measurement response comprising or indicating the information indicating the one or more second quantum measurement results.

16. The device according to claim 11, configured to:

send, to the client, information indicating instructions to regulate a transmission rate of qubits to the device; and receive, via the first quantum channel, qubits according to the transmission rate of qubits.

17. The device according to claim 11, configured to:

receive, from the first server, information indicating instructions to regulate a transmission rate of qubits to the first server; and send, via the second quantum channel, the transformed qubits according to the transmission rate of qubits.

18. The device according to claim 11, configured to:

send, to the first server, a subscription request indicating, or comprising information indicating, one or more parameters; and receive, from the first server, a subscription response indicating, or comprising information indicating, one or more of an authentication of and an authorization of the subscription request based on the one or more parameters.

19. The device according to claim 11, configured to receive information indicating the one or more final quantum measurement results.

20. The device according to claim 11, configured to receive information indicating an address of a quantum memory wherein the one or more first quantum measurement results are stored.

* * * * *